United States Patent
Norton et al.

(10) Patent No.: US 7,756,885 B2
(45) Date of Patent: Jul. 13, 2010

(54) METHODS AND SYSTEMS FOR MULTI-PATTERN SEARCHING

(75) Inventors: Marc A. Norton, Eldersburg, MD (US); Daniel J. Roelker, Arlington, VA (US)

(73) Assignee: Sourcefire, Inc., Columbia, MD (US)

( * ) Notice: Subject to any disclaimer, the term of this patent is extended or adjusted under 35 U.S.C. 154(b) by 339 days.

(21) Appl. No.: 11/785,609

(22) Filed: Apr. 19, 2007

(65) Prior Publication Data
US 2007/0192286 A1 Aug. 16, 2007

Related U.S. Application Data

(62) Division of application No. 10/898,220, filed on Jul. 26, 2004, now Pat. No. 7,539,681.

(51) Int. Cl.
*G06F 17/30* (2006.01)
(52) U.S. Cl. .............. 707/758; 707/797; 707/803; 707/809; 707/922; 726/13; 726/23
(58) Field of Classification Search ............ None
See application file for complete search history.

(56) References Cited

U.S. PATENT DOCUMENTS

| | | | |
|---|---|---|---|
| 4,550,436 A * | 10/1985 | Freeman et al. ............ 382/218 |
| 4,570,157 A | 2/1986 | Kodaira |
| 4,857,912 A | 8/1989 | Everett et al. |
| 4,912,748 A | 3/1990 | Horii et al. |
| 4,985,863 A | 1/1991 | Fujisawa et al. |
| 5,193,192 A | 3/1993 | Seberger |
| 5,222,081 A * | 6/1993 | Lewis et al. ............. 375/369 |
| 5,404,488 A | 4/1995 | Kerrigan et al. |
| 5,430,842 A | 7/1995 | Thompson et al. |
| 5,459,841 A | 10/1995 | Flora-Holmquist et al. |
| 5,497,463 A | 3/1996 | Stein et al. |
| 5,604,910 A * | 2/1997 | Kojima et al. ............ 707/3 |
| 5,796,942 A | 8/1998 | Esbensen |
| 5,870,554 A | 2/1999 | Grossman et al. |
| 5,901,307 A | 5/1999 | Potter et al. ............. 712/240 |

(Continued)

OTHER PUBLICATIONS

Full Band and Matrix Algorithms, Jun. 9, 2004, http://web.archive.org/web/20040109154658/http://www.netlib.org/utk/lsi/pcwLSI/text/node150.html.*

(Continued)

*Primary Examiner*—John R. Cottingham
*Assistant Examiner*—Nicholas E Allen
(74) *Attorney, Agent, or Firm*—Posz Law Group, PLC

(57) ABSTRACT

Embodiments of the present invention relate to systems and methods for optimizing and reducing the memory requirements of state machine algorithms in pattern matching applications. Memory requirements of an Aho-Corasick algorithm are reduced in an intrusion detection system by representing the state table as three separate data structures. Memory requirements of an Aho-Corasick algorithm are are also reduced by applying a banded-row sparse matrix technique to the state transition table of the state table. The pattern matching performance of the intrusion detection system is improved by performing a case insensitive search, where the characters of the test sequence are converted to uppercase as the characters are read. Testing reveals that state transition table with sixteen bit elements outperform state transition table with thirty-two bit elements and do not reduce the functionality of intrusion detection systems using the Aho-Corasick algorithm.

17 Claims, 19 Drawing Sheets

U.S. PATENT DOCUMENTS

| | | | |
|---|---|---|---|
| 5,917,821 A | 6/1999 | Gobuyan et al. | |
| 5,919,257 A | 7/1999 | Trostle | |
| 5,963,942 A | 10/1999 | Igata | |
| 5,987,473 A * | 11/1999 | Jorgensen | 707/104.1 |
| 5,995,963 A | 11/1999 | Nanba et al. | |
| 5,999,937 A * | 12/1999 | Ellard | 707/101 |
| 6,002,427 A | 12/1999 | Kipust | |
| 6,141,686 A | 10/2000 | Jackowski et al. | |
| 6,199,181 B1 | 3/2001 | Rechef et al. | |
| 6,219,786 B1 | 4/2001 | Cunningham et al. | |
| 6,320,848 B1 | 11/2001 | Edwards et al. | |
| 6,321,338 B1 | 11/2001 | Porras et al. | |
| 6,324,656 B1 | 11/2001 | Gleichauf et al. | |
| 6,334,121 B1 | 12/2001 | Primeaux et al. | |
| 6,343,362 B1 | 1/2002 | Ptacek et al. | |
| 6,393,474 B1 | 5/2002 | Eichert et al. | |
| 6,415,321 B1 | 7/2002 | Gleichauf et al. | |
| 6,477,648 B1 | 11/2002 | Schell et al. | |
| 6,487,666 B1 | 11/2002 | Shanklin et al. | |
| 6,499,107 B1 | 12/2002 | Gleichauf et al. | |
| 6,539,381 B1 * | 3/2003 | Prasad et al. | 707/10 |
| 6,587,876 B1 | 7/2003 | Mahon et al. | |
| 6,590,885 B1 | 7/2003 | Jorgensen | |
| 6,678,734 B1 | 1/2004 | Haatainen et al. | |
| 6,678,824 B1 | 1/2004 | Cannon et al. | |
| 6,711,127 B1 | 3/2004 | Gorman et al. | |
| 6,754,826 B1 | 6/2004 | Challenger et al. | |
| 6,766,320 B1 | 7/2004 | Wang et al. | |
| 6,772,196 B1 | 8/2004 | Kirsch et al. | |
| 6,789,202 B1 | 9/2004 | Ko et al. | |
| 6,851,061 B1 | 2/2005 | Holland et al. | |
| 6,957,348 B1 | 10/2005 | Flowers et al. | |
| 6,983,323 B2 | 1/2006 | Cantrell et al. | |
| 6,999,998 B2 | 2/2006 | Russell | |
| 7,032,114 B1 | 4/2006 | Moran | 713/187 |
| 7,058,821 B1 | 6/2006 | Parekh et al. | |
| 7,065,657 B1 | 6/2006 | Moran | |
| 7,073,198 B1 | 7/2006 | Flowers et al. | 726/25 |
| 7,076,803 B2 | 7/2006 | Bruton et al. | |
| 7,096,503 B1 | 8/2006 | Magdych et al. | |
| 7,113,789 B1 | 9/2006 | Boehmke | |
| 7,133,916 B2 | 11/2006 | Schunemann | |
| 7,134,141 B2 | 11/2006 | Crosbie et al. | |
| 7,152,105 B2 | 12/2006 | McClure et al. | 709/224 |
| 7,181,769 B1 | 2/2007 | Keanini et al. | |
| 7,257,630 B2 | 8/2007 | Cole et al. | 709/224 |
| 7,305,708 B2 | 12/2007 | Norton et al. | |
| 7,310,688 B1 | 12/2007 | Chin | 709/252 |
| 7,313,695 B2 | 12/2007 | Norton et al. | |
| 7,315,801 B1 | 1/2008 | Dowd et al. | |
| 7,317,693 B1 | 1/2008 | Roesch et al. | |
| 7,363,656 B2 | 4/2008 | Weber et al. | |
| 2001/0027485 A1 | 10/2001 | Ogishi et al. | |
| 2001/0034847 A1 | 10/2001 | Gaul, Jr. | |
| 2002/0035639 A1 | 3/2002 | Xu | |
| 2002/0066034 A1 | 5/2002 | Schlossberg | |
| 2002/0083344 A1 | 6/2002 | Vairavan | |
| 2002/0087716 A1 | 7/2002 | Mustafa | |
| 2002/0112185 A1 | 8/2002 | Hodges | |
| 2002/0123995 A1* | 9/2002 | Shibuya | 707/6 |
| 2002/0165707 A1 | 11/2002 | Call | |
| 2003/0014662 A1 | 1/2003 | Gupta et al. | |
| 2003/0046388 A1 | 3/2003 | Milliken | |
| 2003/0065817 A1 | 4/2003 | Benchetrit et al. | |
| 2003/0083847 A1 | 5/2003 | Schertz et al. | |
| 2003/0093517 A1 | 5/2003 | Tarquini et al. | |
| 2003/0101353 A1 | 5/2003 | Tarquini et al. | 713/200 |
| 2003/0140250 A1 | 7/2003 | Taninaka et al. | |
| 2003/0195874 A1* | 10/2003 | Akaboshi | 707/3 |
| 2003/0212910 A1 | 11/2003 | Rowland et al. | |
| 2003/0229726 A1 | 12/2003 | Daseke et al. | |
| 2004/0015728 A1 | 1/2004 | Cole et al. | |
| 2004/0034773 A1 | 2/2004 | Balabine et al. | |
| 2004/0064726 A1 | 4/2004 | Girouard | |
| 2004/0073800 A1 | 4/2004 | Shah et al. | |
| 2004/0093582 A1 | 5/2004 | Segura | |
| 2004/0098618 A1 | 5/2004 | Kim et al. | |
| 2004/0123153 A1 | 6/2004 | Wright et al. | |
| 2004/0172234 A1* | 9/2004 | Dapp et al. | 704/1 |
| 2004/0179477 A1* | 9/2004 | Lincoln et al. | 370/241 |
| 2004/0193943 A1 | 9/2004 | Angelino et al. | |
| 2004/0221176 A1 | 11/2004 | Cole | |
| 2004/0268358 A1 | 12/2004 | Darling et al. | |
| 2005/0005169 A1 | 1/2005 | Kelekar | |
| 2005/0044422 A1 | 2/2005 | Cantrell et al. | |
| 2005/0108393 A1 | 5/2005 | Banerjee et al. | |
| 2005/0113941 A1 | 5/2005 | Ii et al. | |
| 2005/0114700 A1 | 5/2005 | Barrie et al. | |
| 2005/0160095 A1 | 7/2005 | Dick et al. | |
| 2005/0172019 A1 | 8/2005 | Williamson et al. | |
| 2005/0188079 A1 | 8/2005 | Motsinger et al. | |
| 2005/0229255 A1 | 10/2005 | Gula et al. | |
| 2005/0240604 A1 | 10/2005 | Corl, Jr. et al. | |
| 2005/0251500 A1 | 11/2005 | Vahalia et al. | |
| 2005/0268331 A1 | 12/2005 | Le et al. | |
| 2005/0268332 A1 | 12/2005 | Le et al. | |
| 2005/0273857 A1 | 12/2005 | Freund | |
| 2006/0174337 A1 | 8/2006 | Bernoth | |
| 2006/0265748 A1 | 11/2006 | Potok | |
| 2006/0294588 A1 | 12/2006 | Lahann et al. | |
| 2007/0192863 A1 | 8/2007 | Kapoor et al. | |
| 2007/0288579 A1 | 12/2007 | Schunemann | |
| 2008/0168561 A1 | 7/2008 | Durie et al. | |
| 2009/0028147 A1 | 1/2009 | Russell | |

OTHER PUBLICATIONS

Office Action issued by the U.S. Patent Office on Oct. 6, 2008 in connection with related U.S. Appl. No. 10/843,374.

Notice of Allowance issued by the U.S. Patent Office on Oct. 15, 2008 in connection with related U.S. Appl. No. 10/951,796.

Notice of Allowance issued by the U.S. Patent Office on Oct. 21, 2008 in connection with related U.S. Appl. No. 10/843,375.

European Office Action issued by the European Patent Office on Nov. 28, 2008 in connection with European patent application No. 07 015 003.2-2413, which corresponds to related U.S. Appl. No. 11/501,776.

Office Action issued by the U.S. Patent Office on Dec. 17, 2008 in connection with related U.S. Appl. No. 10/843,398.

Office Action issued by the U.S. Patent Office on Dec. 23, 2008 in connection with related U.S. Appl. No. 11/272,034.

Office Action issued on Feb. 5, 2008 in connection with the related U.S. Appl. No. 10/843,375.

Spitzner, Lance; Passive Fingerprinting, May 3, 2003; Focus on Intrusion Detection; pp. 1-4; obtained from http://www.ctillhq.com/pdfdb/000183/data.pdf.

Lyon, Gordon; Remote OS detection via TCP/IP Stack Fingerprinting, Jun. 30, 2002; pp. 1-12; obtained from: http://web.archive.org/web/20021017063625/www.insecure.org/nmap/nmap-fingerprinting-article.html.

Office Action issued by the U.S. Patent Office on Jan. 16, 2009 in connection with related U.S. Appl. No. 10/843,353.

Office Action issued by the U.S. Patent Office on Jan. 21, 2009 in connection with related U.S. Appl. No. 11/493,934.

Notice of Allowance issued by the U.S. Patent Office on Jan. 21, 2009 in conncection with parent U.S. Appl. No. 10/898,220.

Office Action issued by the U.S. Patent Office on Feb. 4, 2009 in connection with related U.S. Appl. No. 10/843,373.

Office Action issued by the U.S. Patent Office on Feb. 9, 2009 in connection with related U.S. Appl. No. 10/843,459.

International Preliminary Report on Patentability and Written Opinion of the International Searching Authority mailed on Mar. 3, 2009 in connection with PCT application No. PCT/US05/025584, which corresponds to parent U.S. Appl. No. 10/898,220.

International Preliminary Report on Patentability and Written Opinion of the International Searching Authority mailed on Mar. 17, 2009 in connection with corresponding PCT application No. PCT/US06/43820, which corresponds to related U.S. Appl. No. 11/272,035.

Norton. "Optimizing Pattern Matching for Intrusion Detection." [online], Jul. 4, 2004, [retrieved on Nov. 9, 2006]. Retrieved from the Internet <URL:http://docs.idsresearch.org/OptimizingPatternMatchingForIDS.pdf>.

Roelker. "HTTP IDS Evasions Revisited." [online], Aug. 1, 2003, [retrieved on Nov. 9, 2006]. Retrieved from the Internet <URL: http://docs.idsresearch.org/http_ids_evasions.pdf>.

B. Krishnamurthy, "Web Protocols and Practice", May 1, 2001; pp. 518-520.

U.S. Appl. No. 10/843,353, filed May 2004, Roesch et al., System and Method for Determining Characteristics of a Network and Analyzing Vulnerabilities.

U.S. Appl. No. 10/843,373, filed May 2004, Roesch et al., Systems and Methods for Identifying the Services of a Network.

U.S. Appl. No. 10/843,374, filed May 2004, Roesch et al., System and Methods for Determining Characteristics of a Network Based on Flow Analysis.

U.S. Appl. No. 10/843,375, filed May 2004, Roesch et al., Systems and Methods for Determining Characteristics of a Network and Assessing Confidence.

U.S. Appl. No. 10/843,398, filed May 2004, Roesch et al., Systems and Methods for Determining Characteristics of a Network.

U.S. Appl. No. 10/843,459, filed May 2004, Roesch et al., Systems and Methods for Determining Characteristics of a Network and Enforcing Policy.

U.S. Appl. No. 10/898,220, filed Jul. 2004, Norton et al., Methods and Systems for Multi-Pattern Searching.

U.S. Appl. No. 10/951,796, filed Sep. 2004, Roelker et al., Intrusion Detection Strategies for Hypertext Transport Protocol.

U.S. Appl. No. 11/272,033, filed Nov. 2005, Dempster et al., Systems and Methods for Identifying the Client Applications of a Network.

U.S. Appl. No. 11/272,034, filed Nov. 2005, Vogel, III et al., Systems and Methods for Modifying Network Map Attributes.

U.S. Appl. No. 11/272,035, filed Nov. 2005, Gustafson et al., Intrusion Event Correlation with Network Discovery Information.

U.S. Appl. No. 11/493,934, filed Jul. 2006, Roesch et al., Device, System and Method for Analysis of Fragments in a Fragment Train.

U.S. Appl. No. 11/501,776, filed Aug. 2006, Roesch et al., Device, System and Method for Analysis of Segments in a Transmission Control Protocol.

U.S. Appl. No. 11/711,876, filed Feb. 2007, Sturges et al., Device, System and Method for Timestamp Analysis of Segments in a Transmission Control.

U.S. Appl. No. 11/905,980, filed Oct. 2007, Roesch, Device, System and Method for Use of Micro-Policies in Intrusion Detection/Prevention.

U.S. Appl. No. 12/010,900, filed Jan. 2008, Norton et al., Methods and Systems for Multi-Pattern Searching.

U.S. Appl. No. 12/149,196, filed Apr. 2008, Rittermann, Real-Time User Awareness for a Computer Network.

U.S. Appl. No. 12/230,338, filed Aug. 2008, Sturges et al., Speed and Memory Optimization of Intrusion Detection System (IDS) and Intrusion Prevention.

T. Ptacek, et al., "Insertion, Evasion, and Denial of Service: Eluding Network Intrusion Detection", Jan. 1998, pp. 1-63.

U. Shankar and V. Paxson, *Active Mapping: Resisting NIDS Evasion Without Altering Traffic*, Proc. IEEE Symposium on Security and Privacy. May 2003, pp. 1-18.

J. Novak, "Target-Based Fragmentation Reassembly" (Apr. 2005), Revision 2.0, pp. 1-32.

S.Siddharth, "Evading NIDS, revisited" (Dec. 12, 2005).

"Snort™ Users Manual 2.6.0," *The Snort Project* (May 23, 2006), pp. 1-126.

"toupper()—convert lowercase character to uppercase," http://www.mkssoftware.com, printed on Sep. 20, 2008 from http://web.archive.org, archive date Jun. 30, 2006, 2 pp.

J. Novak et al., "Target-Based TCP Stream Reassembly" (Aug. 3, 2007), Revision 1.0, pp. 1-23, obtained from: http://www.snort.org/docs/stream5-model AUg032007.pdf.

"TaoSecurity—Dedicated to FreeBSD, network security monitoring, incident response, and network forensics," (Oct. 1, 2007), obtained from: http://taosecurity.blogspot.com/2005/02/shmoocon-concludes-shmoocon-finished.html.

Office Action issued by the U.S. Patent Office on Sep. 6, 2007 in connection with related U.S. Appl. No. 10/843,374.

Notice of Allowance issued by the U.S. Patent Office on Sep. 6, 2007 in connection with related U.S. Appl. No. 10/843,376.

Office Action issued by the U.S. Patent Office on Sep. 26, 2007 in connection with related U.S. Appl. No. 10/843,353.

Office Action issued by the U.S. Patent Office on Oct. 4, 2007 in connection with related U.S. Appl. No. 10/951,796.

Notice of Allowance issued by the U.S. Patent Office on Oct. 5, 2007 in connection with related U.S. Appl. No. 10/793,887.

International Search Report and Written Opinion of the International Searching Authority issued on Oct. 9, 2007 in connection with PCT application No. PCT/US06/43800, which corresponds to U.S. Appl. No. 11/272,034.

Office Action issued by the U.S. Patent Office on Nov. 21, 2007 in connection with related U.S. Appl. No. 10/843,398.

European Search Report issued by the European Patent Office on Nov. 22, 2007 in connection with European patent application No. 07014575.0-1244, which corresponds to related U.S. Appl. No. 11/493,934.

International Search Report and Written Opinion of the International Searching Authority issued on Dec. 5, 2007 in connection with PCT application No. PCT/US05/25583, which corresponds to U.S. Appl. No. 10/951,796.

European Search Report issued by the European Patent Office on Dec. 27, 2007 in connection with European patent application No. 07015003.2-2413, which corresponds to related U.S. Appl. No. 11/501,776.

Office Action issued by the U.S. Patent Office on Jan. 10, 2008 in connection with related U.S. Appl. No. 10/843,373.

Office Action issued by the U.S. Patent Office on Feb. 21, 2008 in connection with related U.S. Appl. No. 11/272,033.

Office Action issued by the U.S. Patent Office on Mar. 12, 2008 in connection with related U.S. Appl. No. 10/843,459.

Office Action issued by the U.S. Patent Office on Mar. 20, 2008 in connection with related U.S. Appl. No. 10/843,374.

Final Office Action issued by the U.S. Patent Office on May 9, 2008 in connection with related U.S. Appl. No. 10/843,353.

International Preliminary Report on Patentability mailed on May 22, 2008 in connection with PCT application No. PCT/US06/43800, which corresponds to U.S. Appl. No. 11/272,034.

Final Office Action issued by the U.S. Patent Office on Jun. 4, 2008 in connection with related U.S. Appl. No. 10/843,398.

International Search Report and Written Opinion of the International Searching Authority issued on Jun. 19, 2008 in connection with PCT application No. PCT/US05/25584, which corresponds to U.S. Appl. No. 10/898,220.

Final Office Action issued by the U.S. Patent Office on Jun. 26, 2008 in connection with related U.S. Appl. No. 10/898,220.

International Search Report and Written Opinion of the International Searching Authority issued on Jun. 30, 2008 in connection with PCT application No. PCT/US07/21351, which corresponds to U.S. Appl. No. 11/905,980.

International Search Report and Written Opinion of the International Searching Authority issued on Jul. 2, 2008 in connection with PCT application No. PCT/US08/02454, which corresponds to U.S. Appl. No. 11/711,876.

International Search Report and Written Opinion of the International Searching Authority issued on Jul. 7, 2008 in connection with PCT application No. PCT/US06/43820, which corresponds to U.S. Appl. No. 11/272,035.

Office Action issued by the U.S. Patent Office on Jul. 11, 2008 in connection with related U.S. Appl. No. 11/272,034.

Final Office Action issued by the U.S. Patent Office on Jul. 17, 2008 in connection with related U.S. Appl. No. 10/843,459.

Final Office Action issued by the U.S. Patent Office on Aug. 6, 2008 in connection with related U.S. Appl. No. 10/843,375.

Notice of Allowance issued by the U.S. Patent Office on Aug. 18, 2008 in connection with related U.S. Appl. No. 11/272,033.

International Search Report and Written Opinion of the International Searching Authority issued on Aug. 18, 2008 in connection with PCT application No. PCT/US08/05466, which corresponds to U.S. Appl. No. 12/149,196.

Final Office Action issued by the U.S. Patent Office on Aug. 19, 2008 in connection with related U.S. Appl. No. 10/843,373.

Final Office Action issued by the U.S. Patent Office on Aug. 20, 2008 in connection with related U.S. Appl. No. 10/843,353.

R. Deraison, et al., "Passive Vulnerability Scanning: Introduction to NeVO," *Tenable Network Security*, May 30, 2004, pp. 1-13.

Full Band and Matrix Algorithms (Jun. 9, 2004), http://web.archive.org/web20040109154658/http://www.netlib.org/utk/lsi/pcwLSI/text/node150.html.

R. Deraison, et al., "Nessus Network Auditing," Sungress Publishing, Jul. 20, 2004, pp. 1-13.

International Preliminary Report on Patentability mailed on Apr. 7, 2009 in connection with PCT application No. PCT/US07/021351, which corresponds to U.S. Appl. No. 11/905/980.

Office Action issued by the U.S. Patent Office on Apr. 28, 2009 in connection with related U.S. Appl. No. 11/501,776.

Final Office Action issued by the U.S. Patent Office on May 13, 2009 in connection with related U.S. Appl. No. 10/843,374.

Office Action issued by the U.S. Patent Office on May 14, 2009 in connection with related U.S. Appl. No. 11/272,034.

International Search Report and Written Opinion of the International Searching Authority mailed on May 27, 2009 in connection with PCT application No. PCT/US09/02210, which corresponds to U.S. Appl. No. 12/230,338.

Office Action issued by the U.S. Patent Office on Jun. 1, 2009 in connection with related U.S. Appl. No. 11/272,035.

Notice of Allowance issued by the U.S. Patent Office on Jun. 11, 2009 in connection with related U.S. Appl. No. 10/843,373.

Office Action issued by the U.S. Patent Office on Jul. 6, 2009 in connection with related U.S. Appl. No. 10/843,459.

Office Action issued by the U.S. Patent Office on Jul. 7, 2009 in connection with related U.S. Appl. No. 10/843,398.

Office Action issued by the U.S. Patent Office on Jul. 28, 2009 in connection with related U.S. Appl. No. 10/843,353.

Office Action issued by the U.S. Patent Office on Jul. 30, 2009 in connection with related U.S. Appl. No. 11/493,934.

Office Action issued by the U.S. Patent Office on Aug. 20, 2009 in connection with related U.S. Appl. No. 10/843,374.

International Preliminary Report on Patentability mailed on Sep. 11, 2009 in connection with PCT application No. PCT/US08/002454, which corresponds to U.S. Appl. No. 11/711,876.

Advisory Action issued by the U.S. Patent Office on Sep. 29, 2009 in connection with related U.S. Appl. No. 10/843,459.

M. Norton, "Multi-Pattern Search Engine" source code, released Mar. 2003 (11 pages total).

J. Howe, "An Environment for "Sniffing" DCE-RPC Traffic," *CITI Technical Report 93-4*, Jun. 21, 1993, 12 pages total.

European Search Report issued by the European Patent Office on Oct. 12, 2009 in connection with corresponding European patent application No. 05773501.1-2201.

Final Office Action issued by the U.S. Patent Office on Oct. 29, 2009 in connection with related U.S. Appl. No. 11/501,776.

International Preliminary Report on Patentability mailed on Nov. 12, 2009 in connection with PCT application No. PCT/US08/005466, which corresponds to U.S. Appl. No. 12/149,196.

Advisory Action issued by the U.S. Patent Office on Dec. 2, 2009 in connection with related U.S. Appl. No. 10/843,398.

Notice of Allowance issued by the U.S. Patent Office on Dec. 8, 2009 in connection with related U.S. Appl. No. 11/501,776.

Final Office Action issued by the U.S. Patent Office on Dec. 8, 2009 in connection with related U.S. Appl. No. 11/272,034.

Final Office Action issued by the U.S. Patent Office on Dec. 9, 2009 in connection with related U.S. Appl. No. 11/272,035.

Office Action issued by the U.S. Patent Office on Dec. 17, 2009 in connection with related U.S. Appl. No. 11/493,934.

Office Action dated Jul. 16, 2007 issued in corresponding U.S. Appl. No. 10/898,220.

Nicholas Chase Active Server Pages 3.0 from Scratch, Que, 1999, Searching for Products, 13 pages.

Aho et al. "Efficient String Matching: An Aid to Bibliographic Search," Communications of the ACM Jun. 1975, vol. 18, No. 6, pp. 333-340.

Tarjan et al. "Storing a Sparse Table" Communications of the ACM, Nov. 1979, vol. 2, No. 11, pp. 606-620.

Norton et al., Multi-Pattern Search Engine Aho-Corasick State Machine, Version 2.0 Mar. 17, 2004, 36 pages.

Norton et al., "Sourcefire Optimizing Pattern Matching for Intrusion Detection," Sep. 2004, 14 pages.

R. Gula, "Passive Vulnerability Detection. *Techniques to passively find network security vulnerabilities*," Sep. 9, 1999 (5 pp.).

R.P. Lippmann et al., "Passive Operating System Identification from TCP/IP Packet Headers," *Proceedings Workshop on Data Mining for Computer Security (DMSEC)*, Nov. 2003 (10 pp.).

N. Brownlee, et al., "Methodology for Passive Analysis of a University Internet Link," *PAM2001 Passive and Active Measurement Workshop*, Apr. 2001 (7 pp.).

Notice of Allowance issued by the U.S. Patent Office on Jan. 7, 2010 in connection with related U.S. Appl. No. 10/843,353.

Notice of Allowance issued by the U.S. Patent Office on Jan. 8, 2010 in connection with related U.S. Appl. No. 10/843,373.

Office Action issued by the European Patent Office on Jan. 15, 2010 in connection with European patent application No. 05773501.1-2201, which corresponds to related U.S. Appl. Nos. 10/898,220, 11/785,609 and 12/010,900.

Advisory Action issued by the U.S. Patent Office on Feb. 24, 2010 in connection with related U.S. Appl. No. 11/272,035.

Office Action issued by the U.S. Patent Office on Mar. 22, 2010 in connection with related U.S. Appl. No. 11/493,934.

Final Office Action issued by the U.S. Patent Office on Mar. 17, 2010 in connection with related U.S. Appl. No. 10/843,374.

Notice of Allowance issued by the U.S. Patent Office on Feb. 5, 2010 in connection with related U.S. Appl. No. 11/272,034.

Office Action issued by the U.S. Patent Office on Mar. 16, 2010 in connection with related U.S. Appl. No. 11/272,035.

International Search Report and Written Opinion of the International Searching Authority issued on Mar. 16, 2010 in connection with PCT application No. PCT/US09/59965, which corresponds to U.S. Appl. No. 12/575,612.

* cited by examiner

|  | AC STD | AC OPT | AC BAND |
|---|---|---|---|
| 10 | 58 | 30 | 3 |
| 25 | 182 | 93 | 9 |
| 50 | 370 | 188 | 19 |
| 100 | 729 | 371 | 41 |
| 300 | 2333 | 1160 | 130 |
| 500 | 3884 | 1930 | 239 |
| 1000 | 7567 | 3760 | 527 |

FIG. 11

|         | Time Diff | Speed Increase | Performance Increase | Memory M-bytes |
|---------|-----------|----------------|----------------------|----------------|
| AC      | 12.4      | 0%             | 0%                   | 56             |
| AC OPT  | 8.5       | 31%            | 46%                  | 28             |
| AC BAND | 10.3      | 17%            | 20%                  | 14             |
| WU-MAN  | 12.1      | 2%             | 2%                   | 26             |

FIG. 18

METHODS AND SYSTEMS FOR MULTI-PATTERN SEARCHING

This application is a division of application Ser. No. 10/898,220 filed on Jul. 26, 2004 now U.S. Pat. No. 7,539,681.

BACKGROUND OF THE INVENTION

1. Field of the Invention

Embodiments of the present invention relate to methods and systems for efficiently searching for patterns in a character stream. More particularly, embodiments of the present invention relate to systems and methods for optimizing and reducing the memory requirements of state machine algorithms in pattern matching applications.

2. Background Information

An intrusion detection system (IDS) examines network traffic packets. An IDS searches for intruders by looking for specific values in the headers of packets and by performing a search for known patterns in the application data layer of packets. Typical IDSs rely heavily on the Aho-Corasick multi-pattern search engine. As a result, the performance characteristics of the Aho-Corasick algorithm have a significant impact on the overall performance of these IDSs.

The pattern search problem in IDSs is a specialized problem that requires consideration of many issues. The real-time nature of inspecting network packets requires the use of a pattern search engine that can keep up with the speeds of modern networks. There are two types of data used in this type of search. These two types of data are the patterns and the search text. The patterns are pre-defined and static. This allows them to be pre-processed into the best form suitable for any given pattern matching algorithm. The search text is dynamically changing as each network packet is received. This prohibits the pre-processing of the search text prior to performing the pattern search. This type of pattern search problem is defined as a serial pattern search. The Aho-Corasick algorithm is a classic serial search algorithm, and was first introduced in 1975. Many variations have been inspired by the Aho-Corasick algorithm, and more recently IDSs have generated a renewed interest in the algorithm due to some of the algorithm's unique properties.

IDSs search for patterns that can be either case sensitive or case insensitive. The Aho-Corasick algorithm was originally used as a case sensitive pattern search engine. The size of the patterns used in a search can significantly affect the performance characteristics of the search algorithm. State machine based algorithms, such as the Aho-Corasick algorithm, are not affected by the size of the smallest or largest pattern in a group. Skip based methods, such as the Wu-Manber algorithm and others that utilize character skipping features, are very sensitive to the size of the smallest pattern. The ability to skip portions of a search text can greatly accelerate the search engines performance. However, skip distance is limited by the smallest pattern. Search patterns in IDSs represent portions of known attack patterns and can vary in size from one to thirty or more characters but are usually small.

The pattern group size usually affects IDS performance because the IDS pattern search problem typically benefits from processor memory caching. Small pattern groups can fit within the cache and benefit most from a high performance cache. As pattern groups grow larger, less of the pattern group fits in the cache, and there are more cache misses. This reduces performance. Most search algorithms will perform faster with ten patterns than they do with one-thousand patterns, for instance. The performance degradation of each algorithm as pattern group size increases varies from algorithm to algorithm. It is desirable that this degradation be sub-linear in order to maintain scalability.

The alphabet size used in current IDSs is defined by the size of a byte. An eight bit byte value is in the range 0 to 255, providing Intrusion Detection Systems with a 256-character alphabet. These byte values represent the ASCII and control characters seen on standard computer keyboards and other non-printable values. For instance, the letter 'A' has a byte value of sixty-five. Extremely large alphabets such as Unicode can be represented using pairs of byte values, so the alphabet the pattern search engine deals with is still 256 characters. This is a large alphabet by pattern matching standards. The English dictionary alphabet is fifty-two characters for upper and lower case characters, and DNA research uses a four character alphabet in gene sequencing. The size of the alphabet has a significant impact on which search algorithms are the most efficient and the quickest.

Algorithmic attacks by intruders attempt to use the properties and behaviors of a search algorithm against itself to reduce the search algorithm's performance. The performance behavior of a search algorithm should be evaluated by considering the search algorithm's average-case and worst-case performance. Search algorithms that exhibit significantly different worst-case and average-case performance are susceptible to algorithmic attacks by intruders. Skip based search algorithms, such as the Wu-Manber algorithm, utilize a character skipping feature similar to the bad character shift in the Boyer-Moore algorithm. Skip based search algorithms are sensitive to the size of the smallest pattern since they can be shown to be limited to skip sizes smaller than the smallest pattern. A pattern group with a single byte pattern cannot skip over even one character or it might not find the single byte pattern.

The performance characteristics of the Wu-Manber algorithm can be significantly reduced by malicious network traffic, resulting in a Denial of Service attack. This type of attack requires degenerate traffic of small repeated patterns. This problem does not exist for text searches where algorithmic attacks are not intentional and are usually very rare. It is a significant issue in IDSs where algorithmic attacks are prevalent and intentional. The Wu-Manber algorithm also does not achieve its best performance levels in a typical IDS, because IDS rules often include very small search patterns of one to three characters, eliminating most of the opportunities to skip sequences of characters.

In practice, an IDS using the Wu-Manber algorithm provides little performance improvement over an IDS using the Aho-Corasick algorithm in the average-case. However, an IDS using the Wu-Manber algorithm can be significantly slower than an IDS using the Aho-Corasick algorithm when experiencing an algorithmically designed attack. The strength of skip-based algorithms is evident when all of the patterns in a group are large. The skip-based algorithms can skip many characters at a time and are among the fastest average-case search algorithms available in this case. The Aho-Corasick algorithm is unaffected by small patterns. The Aho-Corasick algorithm's worst-case and average-case performance are the same. This makes it a very robust algorithm for IDSs.

The size of search text read by in IDSs is usually less than a few thousand bytes. In general when searching text, the expense of setting up the search pattern and filling the cache with the necessary search pattern information is usually fixed. If the search is performed over just a few bytes, then spreading the setup costs over those few bytes results in a high cost per byte. Whereas, if the search text is very large, spreading the setup cost over the larger search text results in very little overhead cost added to searching each byte of text.

The frequency of searching in an Intrusion Detection System is dependent on the network bandwidth, the volume of traffic on the network, and the size of the network packets. This implies that the frequency of pattern searches and the size of each search text are related due to the nature of the network traffic being searched. Again, as with search text size, a high frequency of searching in an IDS will cause the search setup costs to be significant compared to doing fewer larger text searches.

In view of the foregoing, it can be appreciated that a substantial need exists for methods and systems that take into consideration the many issues associated with pattern searching in IDSs and improve the overall performance of IDSs.

BRIEF SUMMARY OF THE INVENTION

One embodiment of the present invention is a method for building a state table of a state machine algorithm in a pattern matching application. At least one search pattern is identified. A search pattern trie is created. The search pattern trie is made up of a list of all valid characters for each state. Each element of the list of all valid characters includes a valid character and a next valid state pair. At least one search pattern is added to the search pattern trie. The search pattern is added one character at a time to the search pattern trie, where each character represents a state. A non-deterministic finite automata is built from the search pattern trie. The search pattern trie is replaced with the non-deterministic finite automata in a list format. A deterministic finite automata is built from the non-deterministic finite automata. The non-deterministic finite automata is replaced with the deterministic finite automata in a list format. The deterministic finite automata is converted into three separate data structures. These three data structures include a state transition table, an array of per state matching pattern lists, and a separate failure pointer list for each state for the non-deterministic finite automata. These three data structures compose the state table.

Another embodiment of this method involves converting a portion of the deterministic finite automata into a state transition table. A state vector for each state is allocated. A state transition element of the state vector is created for each element of the list of all valid characters. The next valid state of each element of the list of all valid characters is copied into each of the state transition elements of the state vector. In this embodiment, the state transition elements are stored in full vector form.

In another embodiment of this method, the state transition elements are stored in banded-row form. A band is defined as the group of elements from the first nonzero state from the list of all valid characters to the last nonzero state from the list of all valid characters. A state vector is allocated for each state. A state transition element of the state vector is created for each element of the band. An element of the state vector is created to identify an index of the first nonzero state from the list of all valid characters. An element of the state vector is created to identify the number of elements in the band. The state of each element of the band is copied into each state transition element of the state vector.

In another embodiment of this method, an element is added to the state vector to identify the format of the state vector. Exemplary formats include but are not limited to full vector and banded vector. In another embodiment of this method, an element is added to the state vector to identify if the state vector includes a matching pattern state.

Another embodiment of the present invention is a method for searching for search patterns in a text sequence using a state table of a state machine algorithm in a pattern matching application. A character from the text sequence is read. An element of a current state vector of the state table that corresponds to the character is read. If the element is nonzero, a pattern matching element of the current state vector for a matching pattern flag is checked. If the matching pattern flag is set, a pattern match is logged. The current state vector corresponding to the value of the element is selected. The next character from the text sequence is then read.

In another embodiment of this method, an element of the current state vector that identifies a format is checked. If the format is banded, it is determined if the character is in the band. This determination is made using the element of the current state vector identifying a number of elements in the band, the element of the current state vector identifying an index of a first element of the band, and elements of the band. If the character is in the band, the current state vector corresponding to the value of the element is selected. If the character is not in the band, the current state vector is set to the initial state.

Another embodiment of the present invention is a state table for a state machine algorithm used in a pattern matching application. The state table includes a state transition table, an array of per state matching pattern lists, and a failure pointer list for each state for a non-deterministic finite automata. The state transition table includes a state vector for each state. In one embodiment of this state table, the state vector is stored in a sparse vector format. Sparse vector formats include but are not limited to the compressed sparse vector format, the sparse-row format, and the banded-row format. The state machine algorithm is the Aho-Corasik algorithm, for example. The state table and state machine algorithm are used in pattern matching applications including but not limited to intrusion detection systems, passive network monitors, active network monitors, protocol analyzers, and search engines.

BRIEF DESCRIPTION OF THE DRAWINGS

FIG. 11 is a table showing exemplary storage requirements for a dictionary search the standard Aho-Corasick algorithm used in Snort, an embodiment of the present invention using full matrix storage, and an embodiment of the present invention using banded-row storage.

FIG. 18 is a table showing exemplary test results a search of a two G-byte file of Web-centric network traffic using a Wu-Manber algorithm, the standard Aho-Corasick algorithm used in Snort, an embodiment of the present invention using full matrix storage, and an embodiment of the present invention using banded-row storage.

Figure 1:
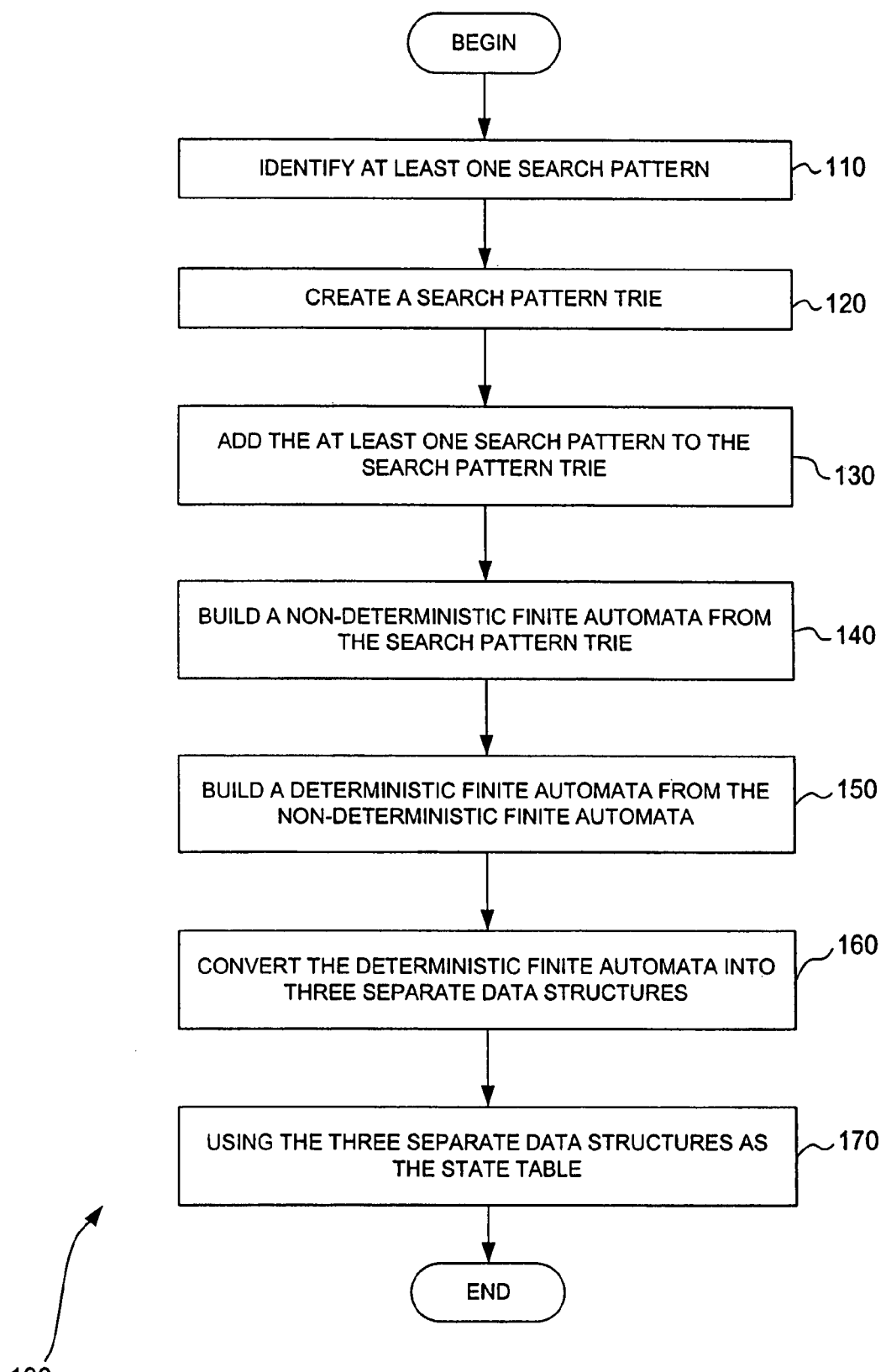
FIG. 1 is a flowchart showing a method for building a state table of a state machine algorithm in a pattern matching application, in accordance with an embodiment of the present invention.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

The Aho-Corasick State Machine

The Aho-Corasick state machine is a specialized finite state machine. A finite state machine is a representation of all of the possible states of a system, along with information about the acceptable state transitions of the system. The processing action of a state machine is to start in an initial state, accept an input event, and move the current state to the next correct state based on the input event. It is possible to model a state machine as a matrix where the rows represent states and the columns represent events. The matrix elements provide the next correct state to move to based on the input event and possibly some specific action to be done or information to be processed when the state is entered or exited. For example, if the current state is state ten and the next input event is event six, then to perform a state transition, the matrix element at row ten and column six is examined. The current state ten is changed to the state indicated by the value of the matrix element at row ten and column six.

An Aho-Corasick state machine is implemented in a typical IDS as a deterministic finite automata (DFA). A unique property of a DFA is that, upon examining an input character in the text stream, it requires exactly one transition of the state machine to find the correct next state. This is in contrast to a non-deterministic finite automata (NFA), which can require more than one state transition to find the correct next state. A DFA can process data faster than an NFA since it requires fewer transition steps. An NFA can require up to twice as many transitions as a DFA to search a stream of data. The construction and structure of the state table matrix of a DFA is also more complicated than that of an NFA. A DFA can be constructed from an NFA by pre-processing all of the possible state transitions in the NFA until it can be determined how to perform all state transitions in a single step. This procedure has the tendency to fill in more elements of the state table matrix. The physical representation of the Aho-Corasick state transition table varies from one implementation to the next. The choice of the state table representation determines the memory and performance tradeoffs of the search algorithm.

Sparse Storage Formats

Sparse matrices and vectors contain a significant number of zero elements and only a few non-zero elements. Methods and storage formats used for operating on sparse structures efficiently are well developed in the field of linear algebra and utilized in many branches of science. It is not sufficient to store sparse data efficiently. The storage format must also allow for fast random access to the data.

A sample sparse matrix is shown below. It contains six rows and four columns.

$$\begin{matrix} 0 & 0 & 0 & 3 \\ 0 & 4 & 0 & 1 \\ 0 & 0 & 0 & 6 \\ 1 & 0 & 0 & 0 \\ 0 & 2 & 0 & 0 \\ 0 & 0 & 5 & 0 \end{matrix}$$

The above matrix is a general rectangular matrix with only a few non-zero elements. Using the compressed row storage (CRS) format it can be stored as shown below.

Value: 3 4 1 6 1 2 5
Column: 4 2 4 4 1 2 3
Row: 1 2 4 5 6 7

This CRS format requires three vectors to hold only the non-zero entries. They are a value vector, a column vector and a row vector. The column vector indicates the column that the corresponding value in the value array belongs to in the matrix. The row vector indicates the index in the Column and Value arrays where each row starts. There are seven entries in each of the value and column vectors, since there are seven non-zero entries in the matrix. There are six row entries, since there are six rows in the matrix. For example, the third row entry indicates the third row starts at the fourth entry in the column and value vectors. This is one of the simplest sparse storage schemes for a matrix, which can be broken down further to handle vectors by considering a single row to be a vector as shown below.

The format shown below is called the compressed sparse vector format. Each vector in this format corresponds to a row of a matrix.

Vector: 0 0 0 2 4 0 0 0 6 0 7 0 0 0 0 0 0 0 0 0
Value: 2 4 6 7
Index: 4 5 9 11

In this compressed sparse vector format, the index array indicates the vector array index of the corresponding value. There are four non-zero values, hence there are four entries in the index and value arrays.

Merging the value and index arrays together into one integer array results in the format shown below. This format is called the sparse-row format.

Sparse-Row: 8 4 2 5 4 9 6 11 7

In this sparse-row format there are nine entries, the first is the total number of words that follows, followed by eight numbers representing four pairs of numbers in index-value order. This is a single array of nine entries, eight in index-value order. This could also be represented as an array of four C language structures each having an Index and a Value entry. In either case, only the number of non-zero entries and one array of the non-zero entries is needed. This storage scheme works well at minimizing the total storage of a sparse vector and works well in applications where every element of the vector must be touched sequentially, such as in matrix-vector multiplication. However, for randomly looking up an individual entry, this format requires a search through the array to find the correct index.

Another representation of a vector uses the banded nature of the vector to store the elements efficiently. This representation also allows random access to the vector elements to be maintained. This representation is called the banded-row format and is shown below.

Num Terms: 8
Start Index: 4
Values: 2 4 0 0 0 6 0 7
Band Array: 8 4 2 4 0 0 0 6 0 7

This banded-row format stores elements from the first non-zero value to the last non-zero value. The number of terms stored is known as the bandwidth of the vector. Small bandwidth corresponds to large storage savings. To manage access to the data, only the number of data elements and the starting index of the data are tracked. This format reduces the storage requirements, and still provides fast random access to the data. Many problems express themselves as banded matrices, in which case the banded-row format can be used for each row in the matrix. This type of banded storage puts no requirements on how the banded-ness of one row will correspond to banded-ness in another row.

The Optimized Aho-Corasick State Machine

One embodiment of the present invention is an optimized Aho-Corasick state machine designed for use in an IDS. In this embodiment, the state table is managed somewhat differently, which allows the search routine to be compiled to a more optimal instruction mix. In a typical IDS using the un-optimized Aho-Corasick state machine algorithm, each entry in the state table has a vector of transitions for the state, a failure pointer for the NFA version of the table, and a list of matching patterns for the state, all contained in one structure. In this embodiment, the state table is broken into a state transition table, an array of per state matching pattern lists, and a separate failure pointer list for each state for the NFA. In other words, the state table is broken into three separate data structures. This division of the state table into three separate data structures improves performance. The size of the state transition table is reduced, which allows the state transition table to be manipulated in memory cache rather than main memory, and therefore improves the overall performance of the state machine algorithm.

The state transition table is a list of pointers to state vectors. Each state vector represents the valid state transitions for that state. In another embodiment of the present invention, each vector also includes a small header that indicates the storage format of the row, and a Boolean flag indicating if any pattern matches occur in this state. The state transition data follows the header. This embodiment also improves performance. Since there is a Boolean flag indicating if any pattern matches occur, a list of matching patterns no longer needs to be traversed at each state transition.

In another embodiment of the present invention, the elements of the state transition table are reduced in size from four bytes to two bytes. Experimentation has revealed that the number of states used by a typical IDS does not exceed sixty-five thousand states, or the maximum number of states that can be represented by two bytes. Previously, four bytes were used, allowing four billion possible states. Again, the use of two byte vector elements reduces memory consumption and improves overall performance.

In another embodiment of the present invention, each input character is converted to uppercase as it is processed in the search, rather than converting the entire input search text prior to the search. Converting the entire input search text requires that uppercase search text be stored in main memory, or, at least, in cache memory. Thus, by converting each input character as it is processed, no memory is required for the uppercase search text in this embodiment. Case conversion takes place in a computer register, for example. As a result, the processing time is reduced.

These above embodiments were shown in tests to significantly improve performance over the un-optimized Aho-Corasick state machine used in a typical IDS.

A search routine is a small piece of code that essentially jumps from state to state based on the input characters in the text stream. A state machine operates by maintaining a current state, accepting an input event (a character in our case), and using a table or matrix to lookup the correct next allowed state based on the current state and input event as shown below in pseudo-computer code.

```
while ( input = next-input )
{
state = state-transition-table[ state, input ]
if( patterns matched in this state ) process patterns....
}
```

The C language code below shows the basic algorithm for the search used by the optimized Aho-Corasick algorithm, in accordance with an embodiment of the present invention.

```
for ( state = 0; T < Tend; T++ )
{
    ps       = NextState[ state ];
    sindex = xlatcase[ T[0] ];
    if( ps[1] )
    {
        for( mlist = MatchList[state];
            mlist != NULL;
            mlist = mlist->next )
        {
        /* process the pattern match */
        }
    }
    state = ps[ 2u + sindex ];
}
```

The NextState array is the array of pointers to the row vectors of the state table. The 'ps' variable is used to point to the current state's optimized storage vector. The optimized storage vector includes the storage format indicator, the Boolean pattern match flag, and state transition vector information. The first two words of the 'ps' array are the storage format and the Boolean match flag. The 'T' parameter is the text being searched, and 'xlatcase' converts the text one byte at a time to upper case for a case independent search. Once a match is found, the pattern is processed. A check is made using the 'ps' variable to determine if any patterns are matched in the current state. If no patterns are matched, the state machine cycles to the next state. If there is a match, all of the patterns that match in the current state are processed in the 'for' loop.

The Sparse Storage Optimized Aho-Corasick State Machine

In another embodiment of the present invention, a banded-row sparse storage format is used in the optimized Aho-Corasick state machine. The vectors of the state transition table are as follows for the banded-row format. The first word indicates the storage format. The second word indicates if any patterns match in this state. The third word indicates the number of terms that are stored for the row. Finally, the fourth word indicates the index of the first term. The banded-row format allows direct index access to an entry. However, a bounds check must be done prior to each indexing operation. A C language example of this algorithm is shown below.

```
for ( state = 0; T < Tend; T++ )
{
    ps       = NextState[ state ];
    sindex = xlatcase[ T[0] ];
    if( ps[1] )
    {
        for( mlist = MatchList[ state ];
            mlist != NULL;
            mlist = mlist->next )
        {
        /* process the pattern match */
        }
    }
    /* Bounds check & state transition */
    if(       sindex <   ps[3]        ) state = 0;
    else if( sindex >= (ps[3] + ps[2]) ) state = 0;
    else    state = ps[ 4u + sindex – ps[3] ];
}
```

The NextState array is the array of pointers to the row vectors of the state table. The 'ps' variable is used to point to the current state's optimized storage vector. The optimized storage vector includes the storage format indicator, the Boolean pattern match flag, and the state transition vector information. The first two words of the 'ps' array are the storage format and the Boolean match flag. The 'T' parameter is the text being searched, and 'xlatcase' converts the text one byte at a time to upper case for a case independent search. The uppercase character is the input-index used in indexing into the banded storage vector. A check is made using the second word of the 'ps' variable to determine if any patterns are matched in the current state (indexing starts with the first word having index of 0). If no patterns are matched, the state machine cycles to the next state. The next state is determined by first performing a bounds check, and then the indexing formula 'index=4+input-index–start-index' is applied to calculate the correct offset of the desired 'input-index.' If there is a match, all of the patterns that match in the current state are processed in the 'for' loop.

Building a State Table

FIG. 1 is a flowchart showing a method 100 for building a state table of a state machine algorithm in a pattern matching application, in accordance with an embodiment of the present invention. The state machine algorithm is the Aho-Corasick algorithm, for example. Pattern matching applications include but are not limited to intrusion detection systems, passive network monitors, active network monitors, protocol analyzers, and search engines.

In step 110 of method 100, at least one search pattern is identified. In another embodiment of this method, the characters of the search pattern are converted to uppercase so that the initial search is case insensitive.

In step 120, a search pattern trie is created. The search pattern trie is made up of a list of all valid characters for each state. Each element of the list of all valid characters includes a valid character and a next valid state pair. In another embodiment of this method, the list of all valid characters for each state includes all uppercase characters for each state. The allows a case insensitive pattern search.

In step 130, at least one search pattern is added to the search pattern trie. The search pattern is added one character at a time to the search pattern trie, where each character represents a state.

In step 140, an NFA is built from the search pattern trie. The search pattern trie is replaced with the NFA in a list format.

The NFA is built from a search pattern trie and placed in list format according to well-known methods.

In step 150, a DFA is built from the NFA. The NFA is replaced with the DFA in a list format. The DFA is built from the NFA and placed in list format according to well-known methods.

In step 160, the DFA is converted into three separate data structures. These three data structures include a state transition table, an array of per state matching pattern lists, and a separate failure pointer list for each state for the NFA. Previously, each entry in the state table had a vector of transitions for the state, a failure pointer for the NFA version of the table, and a list of matching patterns for the state, all contained in one structure.

In step 170, the three data structures are used as the state table.

The entries of the DFA are converted to a state transition table. A state vector is allocated for each state. In another embodiment of this method, each element of the state vector is sixteen bits. There is a state transition element of the state vector for each element of the list of all valid characters. The state of each element of the list of all valid characters is copied into each of the elements of the state vector. In another embodiment of this method, there are two-hundred and fifty-six state transition elements in the state vector.

In another embodiment of this method, an element of the state vector identifies the format of the state vector. Formats include but are not limited to full and banded. In another embodiment of this method, an element of the state vector identifies if the state vector contains a matching pattern state.

In another embodiment of this method, the state transition elements are stored in banded-row form. A band is defined as the group of elements from the first nonzero state from the list of all valid characters to the last nonzero state from the list of all valid characters. A state vector is allocated for each state. In another embodiment of this method, each element of the state vector is sixteen bits. A state transition element of the state vector is created for each element of the band. An element of the state vector is created to identify an index of the first nonzero state from the list of all valid characters. An element of the state vector is created to identify the number of elements in the band. The state of each element of the band is copied into each state transition element of the state vector.

In another embodiment of this method, an element of the state vector identifies the format of the state vector. In another embodiment of this method, an element of the state vector identifies if the state vector contains a matching pattern state.

In one embodiment of the present invention, the full vector format of a state vector consists of two-hundred and fifty-eight elements. Each element is sixteen bits. The first element identifies the storage format. These formats include but are not limited to full and banded. The second element identifies if any patterns match in this state vector. The remaining two-hundred and fifty-six elements are the transition elements.

In another embodiment of the present invention, the sparse banded vector format of a state vector consists of a variable number of elements, but not more than three-hundred. Each element is sixteen bits. The first element identifies the storage format. These formats include but are not limited to full and banded. The second element identifies if any patterns match in this state vector. The third element is the number of elements in a band. The fourth element is the index of the first element in the band. The remaining elements are the transition elements.

In another embodiment of the present invention, the state table is built first by adding each pattern to a list of patterns. Each pattern is converted to upper case and stored for future use in the search engine. This is an initial step to produce a case insensitive search, instead of a typical case sensitive search produced by the typical Aho-Corasick algorithm. The original and uppercase patterns are kept in memory and both are available during the search phase. Each pattern from the list of patterns is added to the state table. Each pattern is added one character at a time, in uppercase, to the state table. Characters are added to a list for each state that stores all of the valid uppercase characters for the state. The list also contains a next valid state parameter for each character. The next valid state is used to direct the search to the next state. This list of the state table is a search pattern trie using a list format.

An NFA is built from the trie, replacing the trie list with the NFA in list format. The construction of the NFA follows the standard Aho-Corasick construction for an NFA. A DFA is built from the NFA, replacing the NFA with the DFA in list format. The construction of the DFA follows the standard Aho-Corasick construction for a DFA.

The DFA is then converted to a full vector format or a banded vector format. For the full vector format, a state vector with two-hundred and fifty-eight elements is created for each state. Each state vector holds a format element, a Boolean pattern match element, and two-hundred and fifty six state transition elements. For each state vector, the format of the state vector is made full by setting the format field value to zero. For each transition element of the state vector, the Boolean pattern match flag is set as matching a pattern or not matching a pattern, using one or zero, respectively. The two-hundred and fifty-six transition elements are initialized to zero for each state. The list of valid state transitions from the DFA are copied to their respective positions in the state element data area. For example, the letter 'A' has a value of sixty-five, and the state for 'A' would be placed in the sixty-fifth position of the transition elements.

For the banded vector format, a state vector with a variable number of elements is created for each state. Each state vector holds a format element, a Boolean pattern match element, a number of elements in the band element, an index of the first element in the band, and the band of state transition elements. The list of valid state transitions from the DFA is examined. The elements from the first nonzero element to the last non-zero element are defined as the band. The band is copied to the state transition elements of the state vector. The number of elements in the band element and index of the first element in the band are also stored in the state vector. The format of the state vector is set to banded or one. For each transition element of the state vector, the Boolean pattern match flag is set as matching a pattern or not matching a pattern, using one or zero, respectively.

Searching for Search Patterns in a Text Sequence

Figure 2:
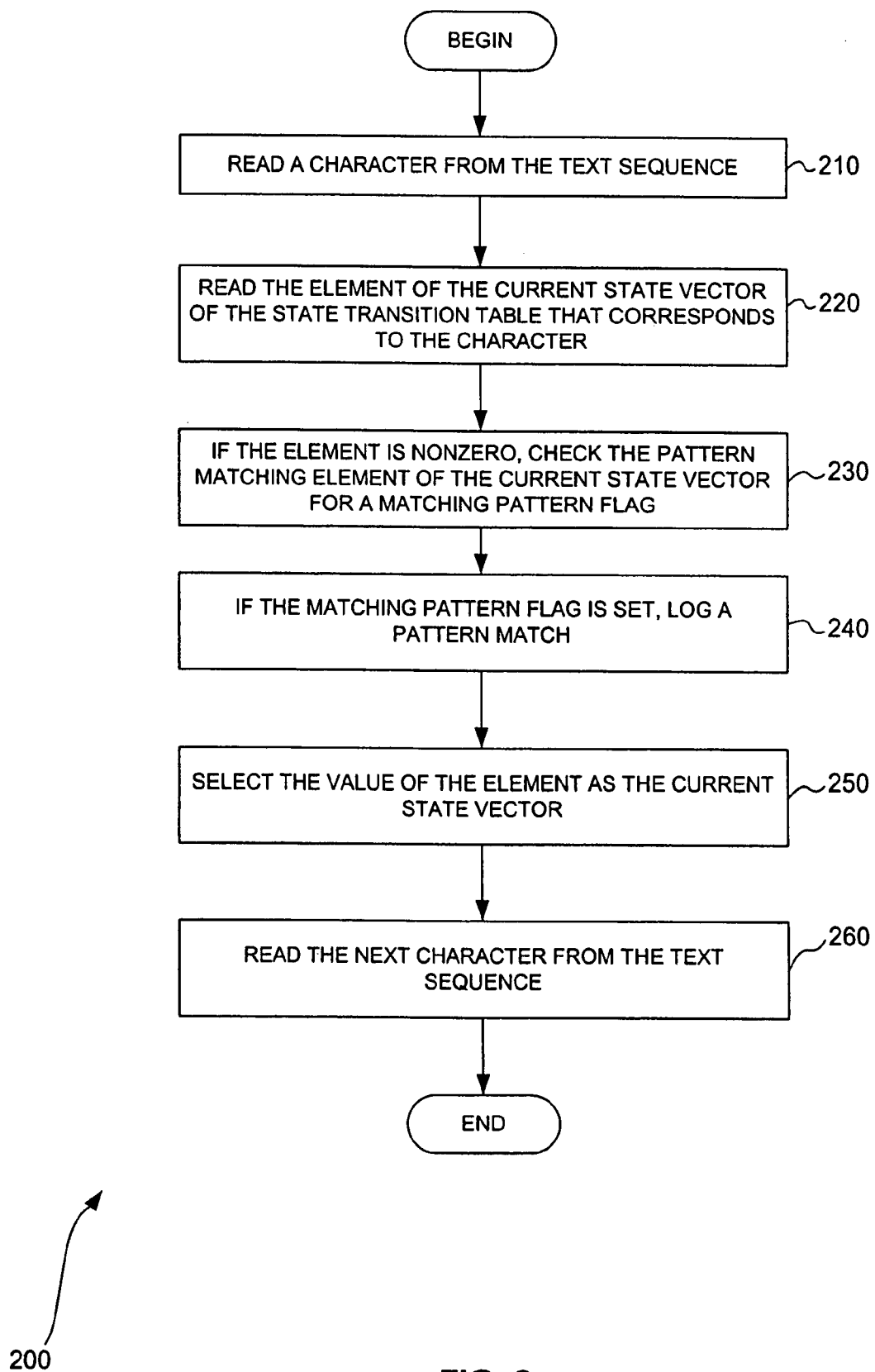
FIG. 2 is a flowchart showing a method for searching for search patterns in a text sequence using a state table of a state machine algorithm in a pattern matching application, in accordance with an embodiment of the present invention.

FIG. 2 is a flowchart showing a method 200 for searching for search patterns in a text sequence using a state table of a state machine algorithm in a pattern matching application, in accordance with an embodiment of the present invention. The state machine algorithm is the Aho-Corasick algorithm, for example. Pattern matching applications include but are not limited to intrusion detection systems, passive network monitors, active network monitors, protocol analyzers, and search engines.

In step 210 of method 200, a character from the text sequence is read. In one embodiment of this method, the character is converted to upper case. This conversion allows a case insensitive search.

In step 220, an element of a current state vector of the state table that corresponds to the character is read.

In step 230, if the element is nonzero, a pattern matching element of the current state vector for a matching pattern flag is checked.

In step 240, if the matching pattern flag is set, a pattern match is logged.

In step 250, the current state vector corresponding to the value of the element is selected.

In step 260, the next character from the text sequence is then read.

In another embodiment of this method, an element of the current state vector that identifies a format is checked. If the format is banded, it is determined if the character is in the band. This determination is made using the element of the current state vector identifying a number of elements in the band, the element of the current state vector identifying an index of a first element of the band, and elements of the band. If the character is in the band, the current state vector corresponding to the value of the element is selected. If the character is not in the band, the current state vector is set to the initial state.

In another embodiment of this method, if the matching pattern flag is set, a case sensitive version of the pattern match from the text sequence and a case sensitive version of a search pattern are compared. If the case sensitive version of the pattern match from the text sequence and the case sensitive version of a search pattern match, the case sensitive version of the pattern match is logged.

State Table

Figure 3:
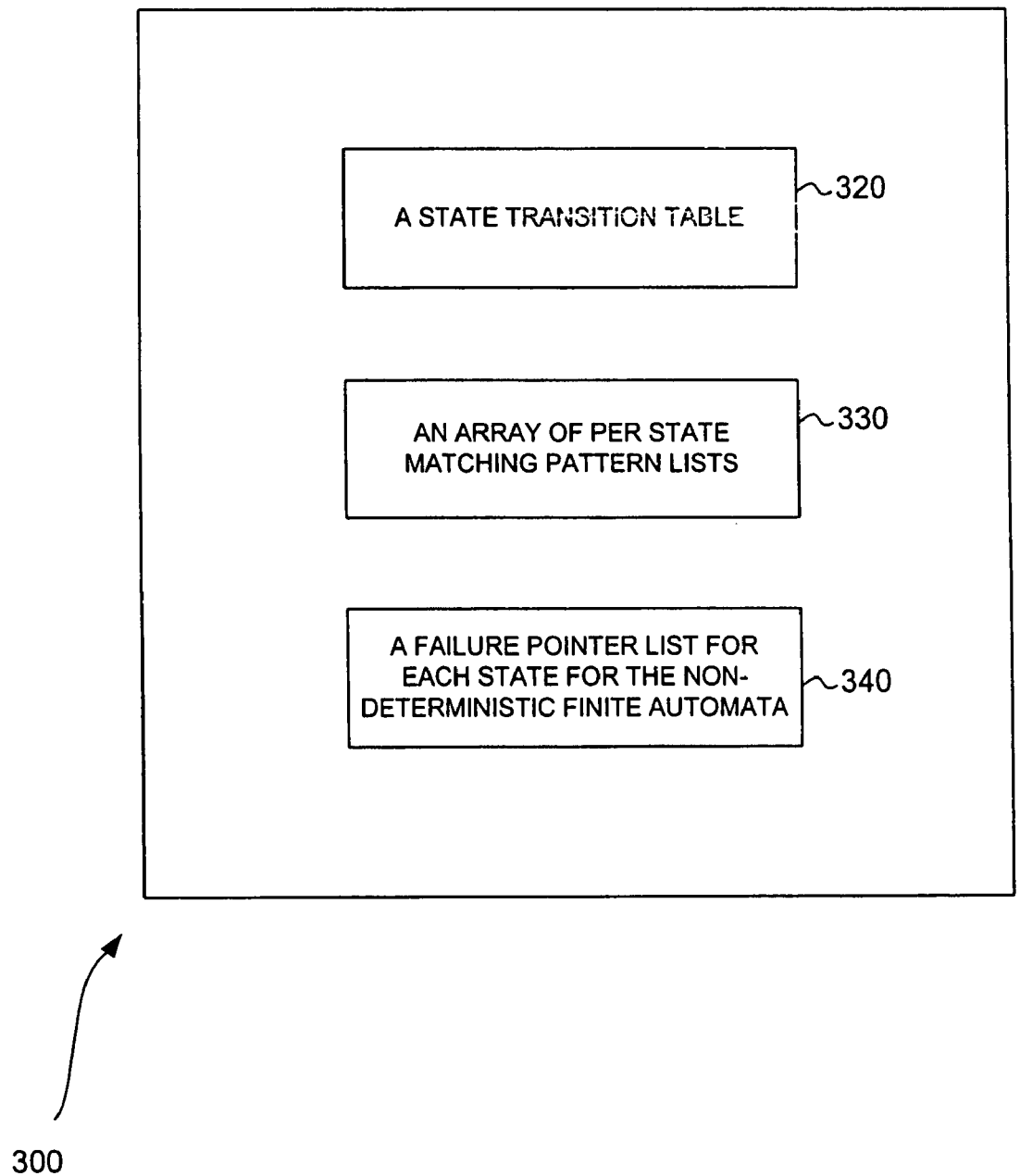
FIG. 3 is schematic diagram of the components of a state table for a state machine algorithm used in a pattern matching application, in accordance with an embodiment of the present invention.

FIG. 3 is schematic diagram of the components of a state table 300 for a state machine algorithm used in a pattern matching application, in accordance with an embodiment of the present invention. State table 300 includes state transition table 320, an array of per state matching pattern lists 330, and failure pointer list for each state for a NFA 340. State transition table 320 includes a state vector for each state. In one embodiment of state table 300, the state vector is stored in a sparse vector format. Sparse vector formats include but are not limited to the compressed sparse vector format, the sparse-row format, and the banded-row format. The state machine algorithm is the Aho-Corasik algorithm, for example. State table 300 and the state machine algorithm are used in pattern matching applications including but not limited to intrusion detection systems, passive network monitors, active network monitors, protocol analyzers, and search engines.

Performance Metrics

Algorithmic or theoretical metrics are based on consideration of the algorithm independent of the hardware or software. Worst-case behavior is an example of an algorithmic metric. Typically, the worst-case performance of a multi-pattern search engine is proportional to the size of the patterns and the length of the data being searched. One embodiment of the present invention is an O(n) algorithm for an IDS, indicating the search speed is proportional to n, the length of the data being searched.

Computational metrics are based on examining how an algorithm interacts with the computer hardware on which it runs. The significant metrics considered are instruction mix, caching properties and pattern group size, and the search text length. The instruction mix refers to the type of hardware instructions required by the algorithm. A sophisticated instruction mix is indicative of algorithms that require special purpose machine instructions or hardware to work efficiently. An embodiment of the present invention has no special instruction mix requirements and can run well on most general-purpose computers.

The caching properties of an algorithm can significantly affect performance. The strongest indicators of caching performance are cache size and data locality. Data locality is defined by the relative amount of sequential versus random memory access the algorithm performs in and out of the cache. An embodiment of the present invention jumps from state to state in the state table. These jumps are data driven, and are essentially random. If only a small part of the state table can fit in the computer's cache, there are likely to be many cache misses, and a cache miss may cost 10 times that of a cache hit. Therefore, the performance of an embodiment of the present invention is very sensitive to the size of the cache, and whether the state table can fit in the cache. Ideally, the cache should be large enough to hold the entire state table and have room left to bring the search data into the cache as needed. This ideal configuration would typically only happen for small state tables, or on systems with very large caches. The state table size is proportional to the total number of characters in all of the patterns included in the search.

The last issue considered in measuring pattern matching performance is the problem domain of the search. A pattern matcher is applied to define the size of the search text, the number of patterns, and the frequency of searches. The problem domain of a typical IDS requires searching network traffic for known attack patterns. The pattern group sizes used in a typical IDS are up to one-thousand or more patterns. A typical IDS searches network packets that average six-hundred to eight-hundred bytes in each search, and a typical IDS does this up to 200,000 times a second. In between pattern searches, other operations occur in a typical IDS that potentially flush the cache. Each time a pattern search is started, the cache has to be reloaded which can represent a noticeable setup cost for each search. In direct contrast to this type of search is the sequential search of a very large data stream. This type of search allows the higher performance cached data accesses to greatly accelerate the overall search performance. A dictionary test demonstrates this behavior.

Test Results

Snort is an exemplary IDS. Test results for the standard Aho-Corasick algorithm previously used in Snort, an embodiment of the present invention using full matrix storage implemented in Snort, and an embodiment of the present invention using banded-row storage implemented in Snort are presented.

The testing was divided into two types of pattern search tests. Dictionary tests were used to demonstrate the relative merits of pattern search engines. The dictionary test selected was used to provide a long stream of text to search, providing the software an opportunity to achieve the best possible caching performance. A network traffic capture file was also used and demonstrated the relative performance of all three versions of the Aho-Corasick algorithm as implemented in Snort.

The dictionary test selected 1000 patterns from throughout an online King-James bible. These patterns were used in groups of ten to one-thousand to search through the 1903 Webster's unabridged dictionary, about 2.3 megabytes of data. This ensured that there were plenty of successful pattern matches, causing the test to provide complete coverage of the search routine by executing both byte testing and matching pattern code.

The three versions of the Aho-Corasick algorithm tested included: (1) the standard version already in use in Snort, which treats the state table as a full matrix, (2) an embodiment of the present invention using full matrix storage, and (3) an embodiment of the present invention using banded-row storage.

A test bed was developed that included several different compiled versions of each of the Aho-Corasick routines to be tested. The compilers used included Microsoft™ Visual C++™ 6.0 (VC60), Intel™ C 6.0, and Cygwin gcc 3.3.1. Using three different compilers provided broader insight into the performance and caching behavior of the search algorithm and storage methods.

Figure 4:
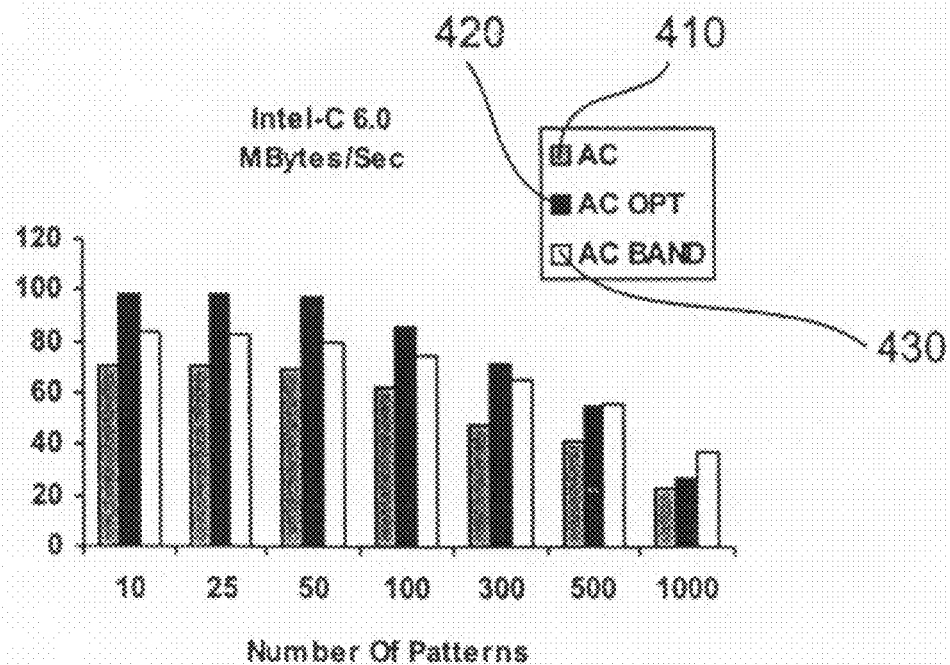
FIG. 4 is a bar graph showing exemplary test results for a dictionary search using the standard Aho-Corasick algorithm used in Snort, an embodiment of the present invention using full matrix storage, and an embodiment of the present invention using banded-row storage all compiled with an Intel™ C 6.0 compiler.
Figure 5:
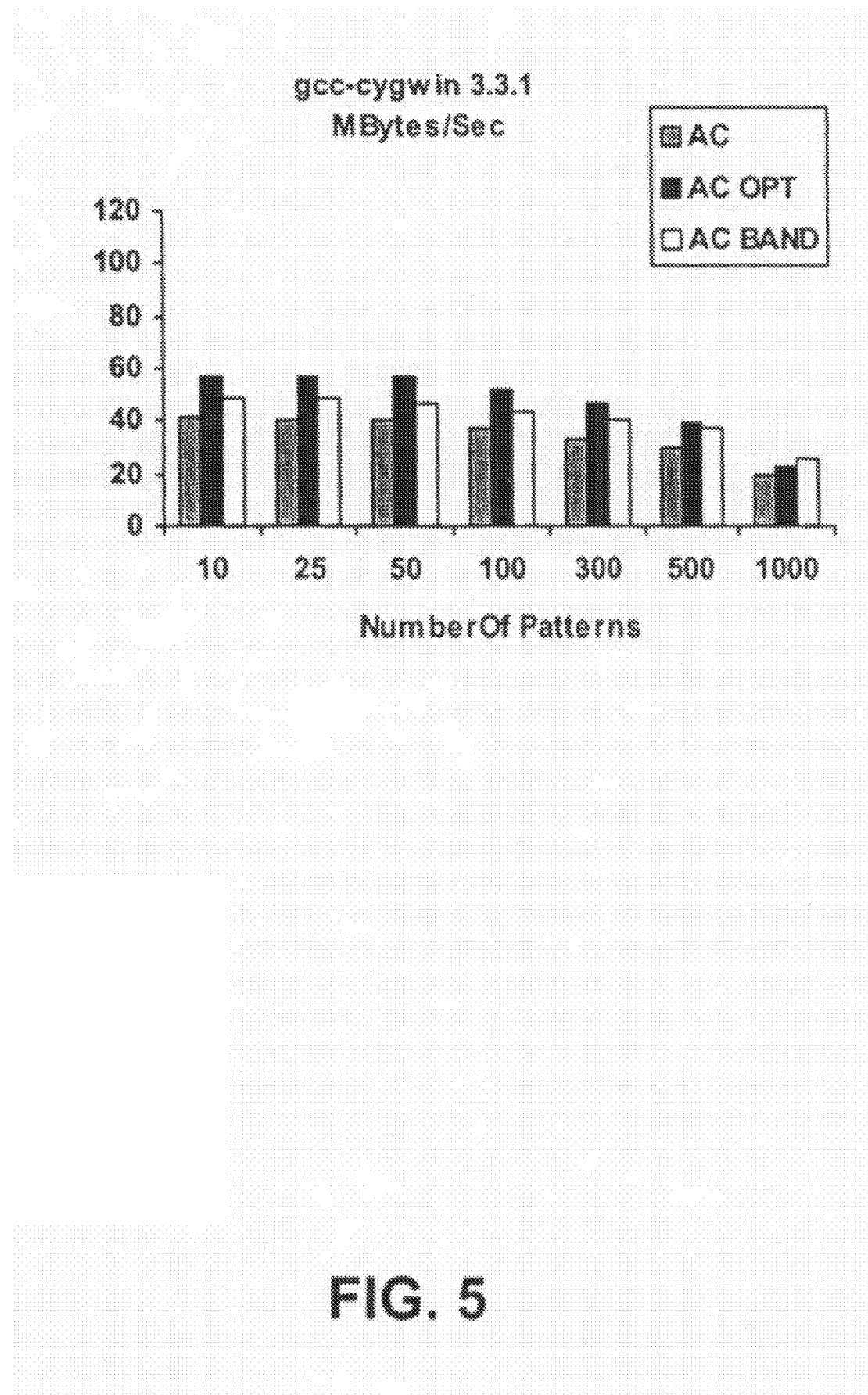
FIG. 5 is a bar graph showing exemplary test results for a dictionary search using the standard Aho-Corasick algorithm used in Snort, an embodiment of the present invention using full matrix storage, and an embodiment of the present invention using banded-row storage all compiled with a Cygwin gcc 3.3.1 compiler.
Figure 6:
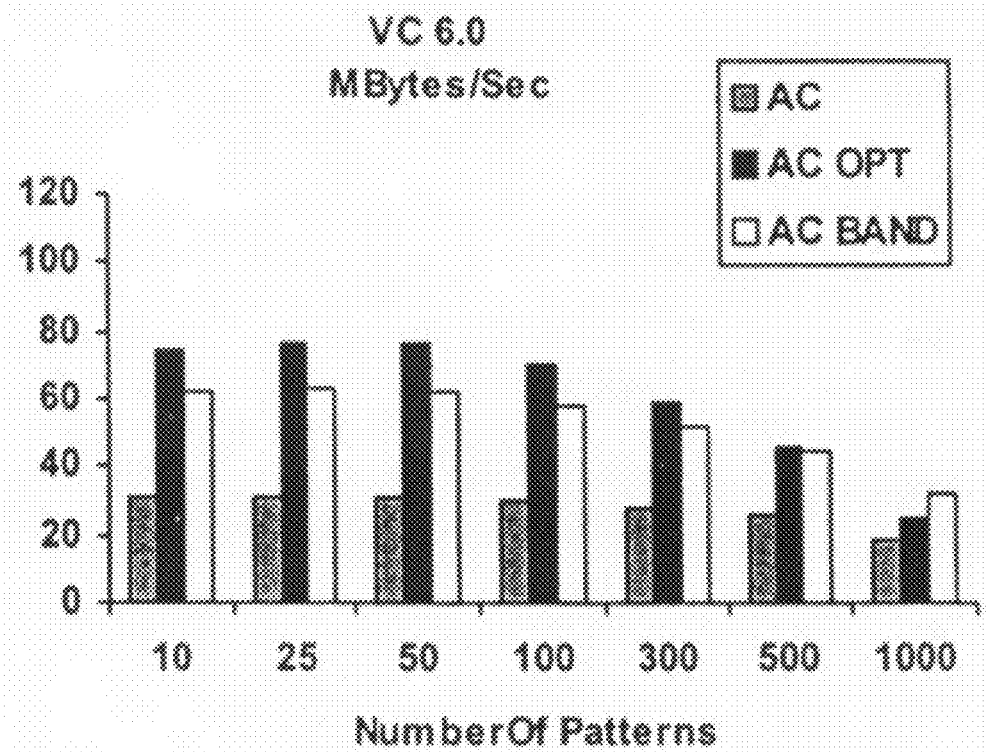
FIG. 6 is a bar graph showing exemplary test results for a dictionary search using the standard Aho-Corasick algorithm used in Snort, an embodiment of the present invention using full matrix storage, and an embodiment of the present invention using banded-row storage all compiled with a Microsoft™ Visual C++™ 6.0 compiler.
Figure 7:
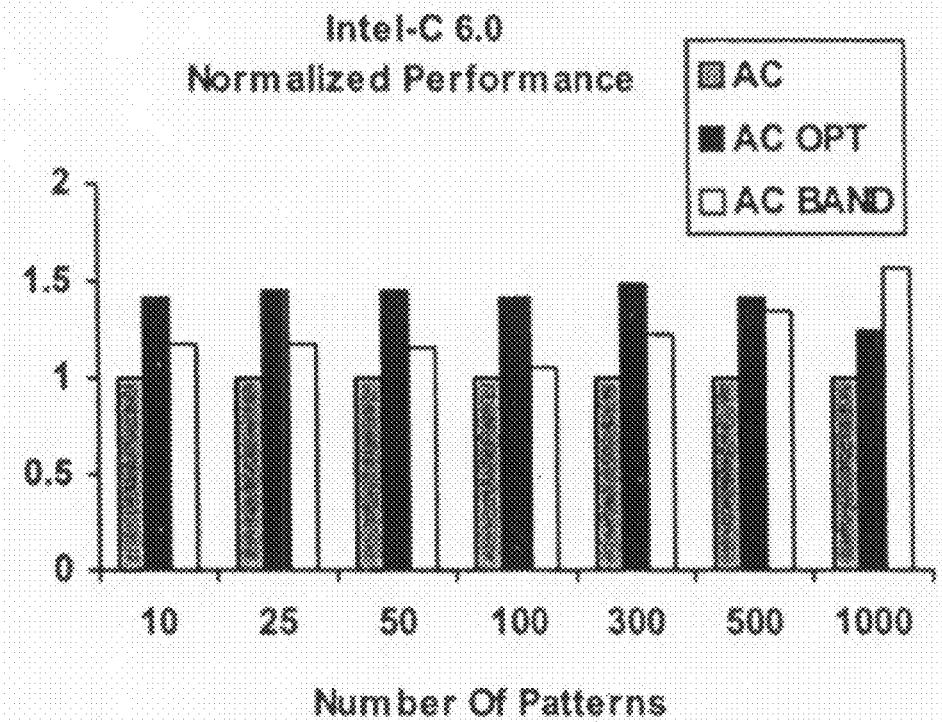
FIG. 7 is a bar graph showing exemplary test results for a dictionary search using the standard Aho-Corasick algorithm used in Snort, an embodiment of the present invention using full matrix storage, and an embodiment of the present invention using banded-row storage all compiled with an Intel™ C 6.0 compiler and normalized to the results of the standard Aho-Corasick algorithm used in Snort.
Figure 8:
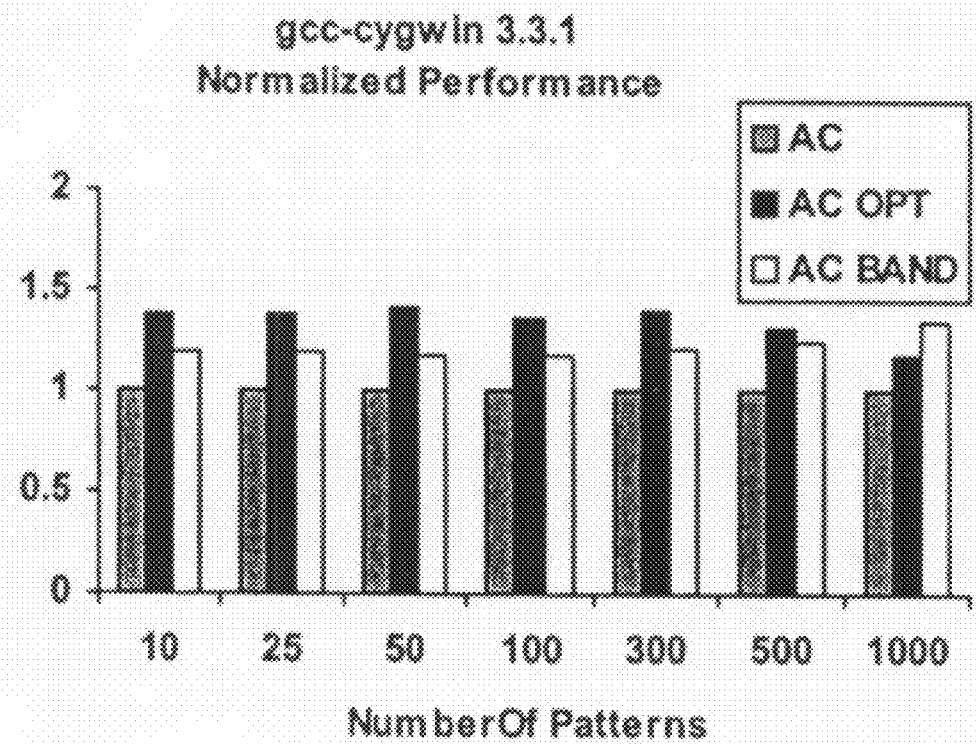
FIG. 8 is a bar graph showing exemplary test results for a dictionary search using the standard Aho-Corasick algorithm used in Snort, an embodiment of the present invention using full matrix storage, and an embodiment of the present invention using banded-row storage all compiled with a Cygwin gcc 3.3.1 compiler and normalized to the results of the standard Aho-Corasick algorithm used in Snort.
Figure 9:
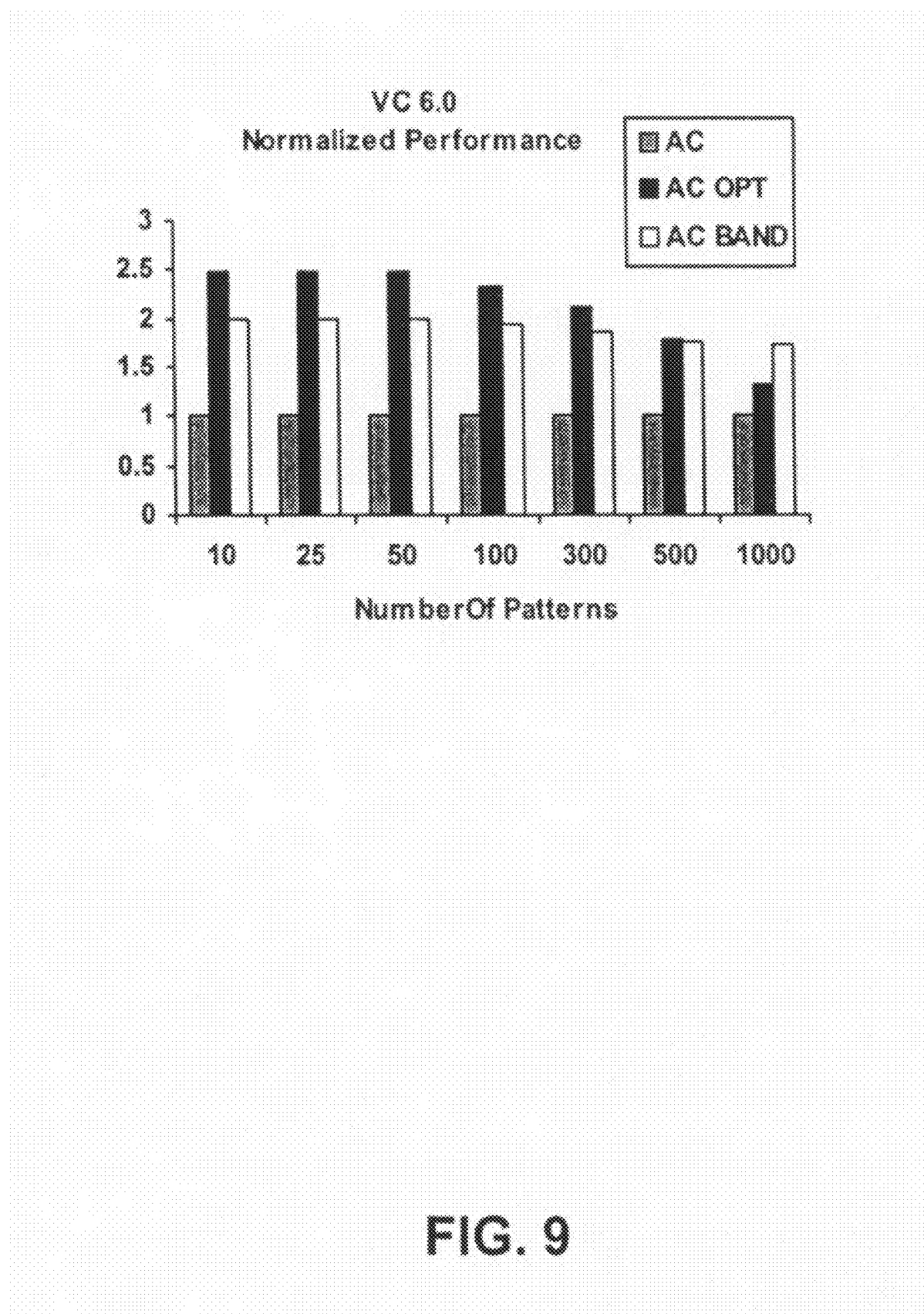
FIG. 9 is a bar graph showing exemplary test results for a dictionary search using the standard Aho-Corasick algorithm used in Snort, an embodiment of the present invention using full matrix storage, and an embodiment of the present invention using banded-row storage all compiled with a Microsoft™ Visual C++™ 6.0 compiler and normalized to the results of the standard Aho-Corasick algorithm used in Snort.

All results are for the DFA version of the Aho-Corasick algorithm. The exact results for the dictionary tests on all three compilers are shown in FIGS. 4, 5, and 6. Results normalized against the standard Aho-Corasick algorithm are shown in FIGS. 7, 8, and 9. The legends for the bar graphs in FIGS. 4-10 are the same. As shown in FIG. 4, AC 410 refers to the results from standard version of the Aho-Corasick algorithm already in use in Snort, AC OPT 420 refers to the results from an embodiment of the present invention using full matrix storage, and AC BAND 430 refers to the results from an embodiment of the present invention using banded-row storage. These tests were conducted using sixteen bit state values on a Dell™ 8100 1.7 GHz system with one G-byte of RAM.

The optimized versions performed significantly better than the standard version in the dictionary tests with all three compilers. Comparing the compiler results in FIGS. 4, 5, and 6 shows that the Intel™ compiler ranked best in raw performance. The gcc compiler performed better than the VC60 compiler with the standard Aho-Corasick, but the VC60 compiler performed better than the gcc compiler with an embodiment of the present invention using full matrix storage and an embodiment of the present invention using banded-row storage.

All three compilers produced similar performance trends. There is at least a 1.4 times speed improvement of an embodiment of the present invention using full matrix storage over the standard Aho-Corasick algorithm, except for the case of the VC60 compiler, where there is as much as a 2.5 times improvement on smaller pattern groups. An embodiment of the present invention using banded-row storage also produces a significant speedup. In fact, an embodiment of the present invention using banded-row storage performed the best on the largest pattern group. All three compilers showed an embodiment of the present invention using full matrix storage to be faster than an embodiment of the present invention using banded-row storage for all pattern group sizes up to five-hundred patterns. At one-thousand patterns, an embodiment of the present invention using banded-row storage outperformed an embodiment of the present invention using full matrix storage for all three compilers.

Figure 10:
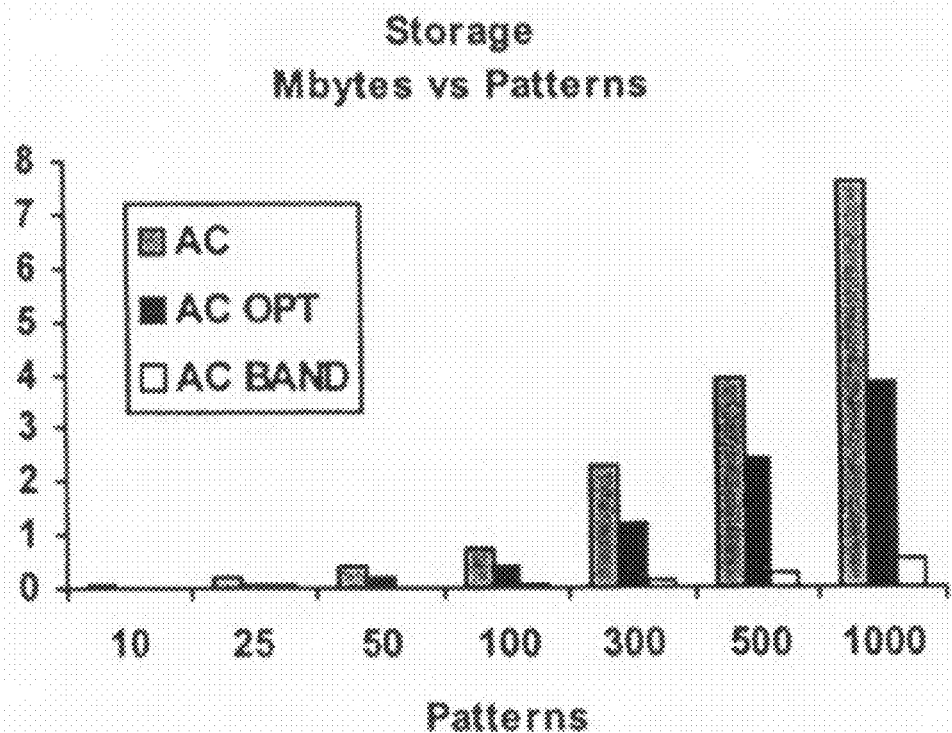
FIG. 10 is a bar graph showing exemplary storage requirements for a dictionary search using the standard Aho-Corasick algorithm used in Snort, an embodiment of the present invention using full matrix storage, and an embodiment of the present invention using banded-row storage.

The storage requirements for the different pattern group sizes are shown in FIG. 10, with the tabular results shown in FIG. 11. These results reflect a sixteen bit state size. An embodiment of the present invention using full matrix storage uses one-half the memory of the standard Aho-Corasick algorithm, due to its use of a sixteen bit word size for state values. An embodiment of the present invention using banded-row storage uses about one-fifteenth the storage of the standard Aho-Corasick algorithm, and about one-seventh the storage of an embodiment of the present invention using full matrix storage.

Figure 12:
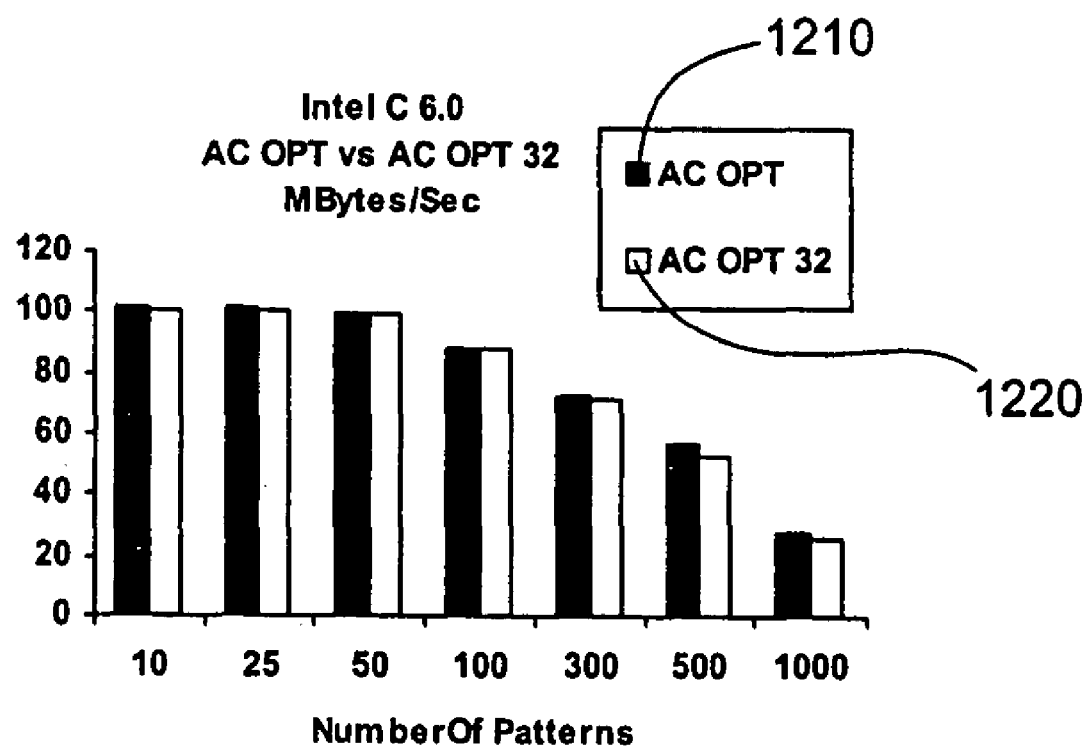
FIG. 12 is a bar graph showing exemplary test results for a dictionary search using an embodiment of the present invention using full matrix storage with sixteen bit and thirty-two bit state values both compiled with an Intel™ C 6.0 compiler.
Figure 13:
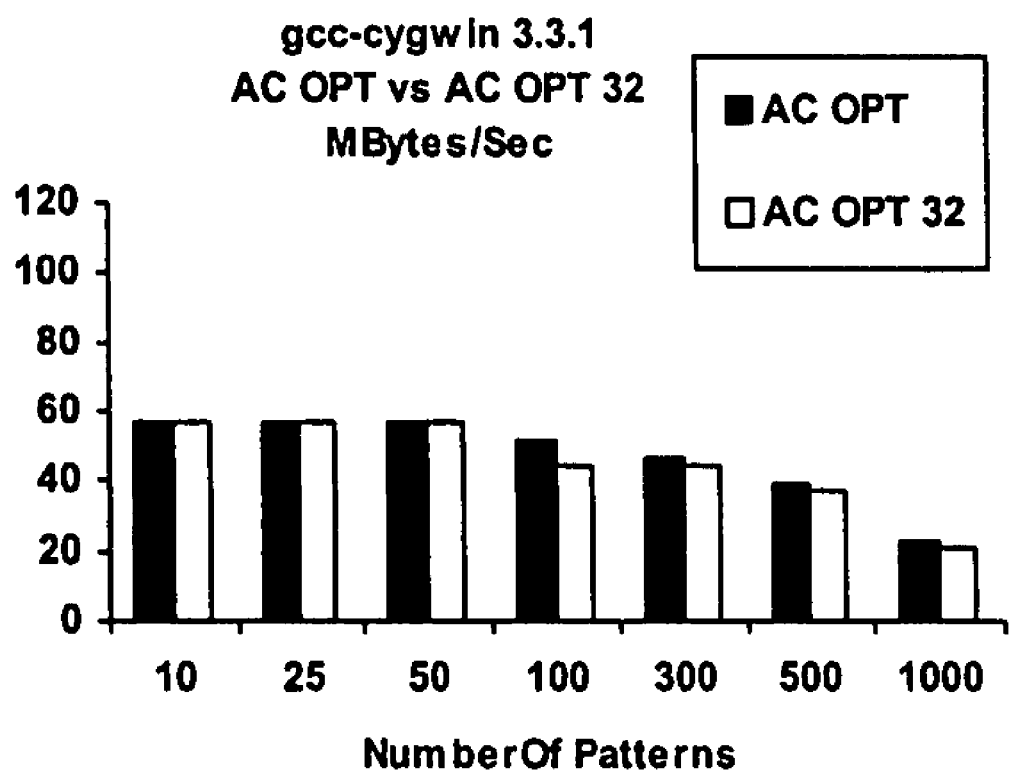
FIG. 13 is a bar graph showing exemplary test results for a dictionary search using an embodiment of the present invention using full matrix storage with sixteen bit and thirty-two bit state values both compiled with a Cygwin gcc 3.3.1 compiler.
Figure 14:
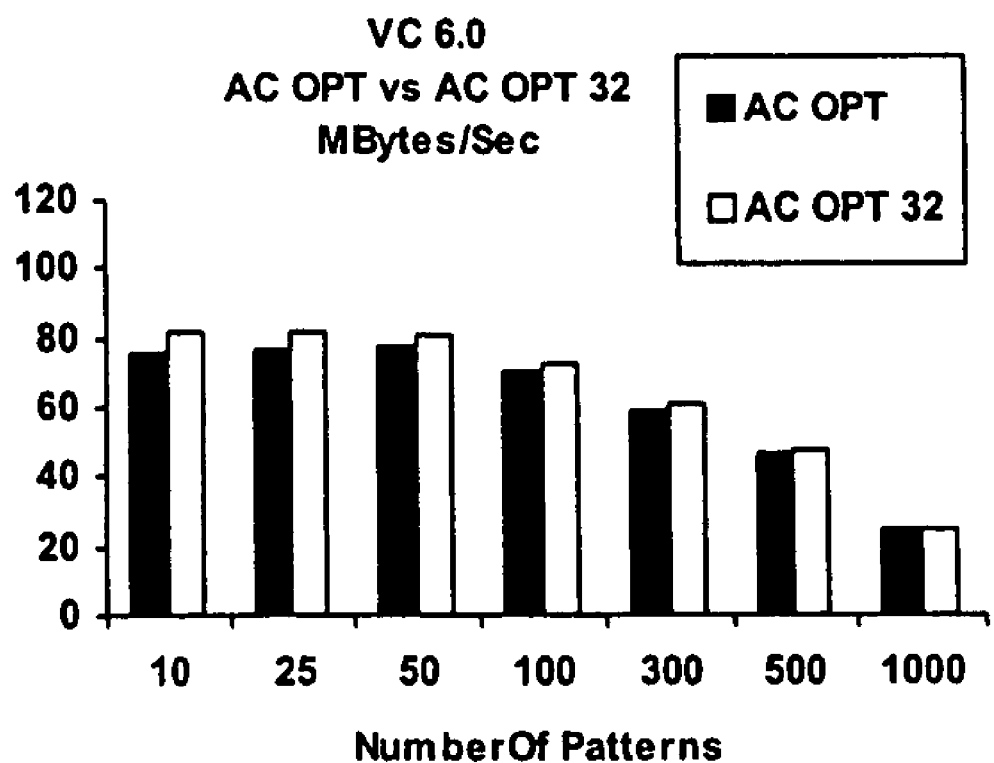
FIG. 14 is a bar graph showing exemplary test results for a dictionary search using an embodiment of the present invention using full matrix storage with sixteen bit and thirty-two bit state values both compiled with a Microsof™ Visual C++™ 6.0 compiler.
Figure 15:
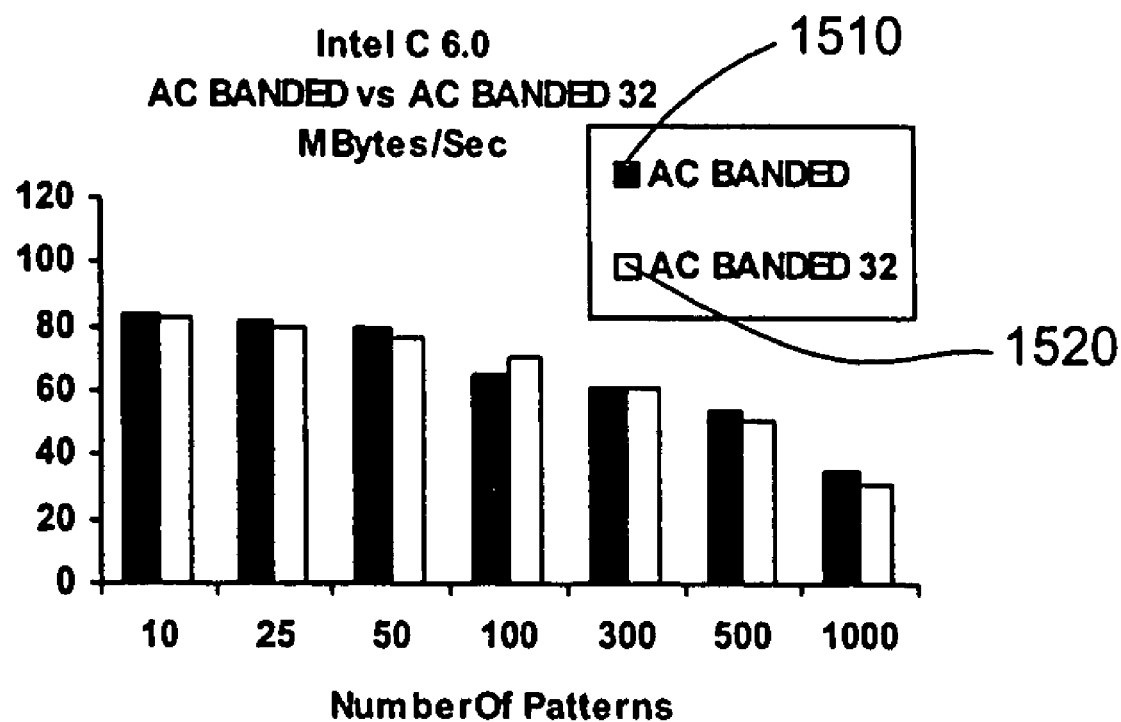
FIG. 15 is a bar graph showing exemplary test results for a dictionary search using an embodiment of the present invention using banded-row storage with sixteen bit and thirty-two bit state values both compiled with an Intel™ C 6.0 compiler.
Figure 16:
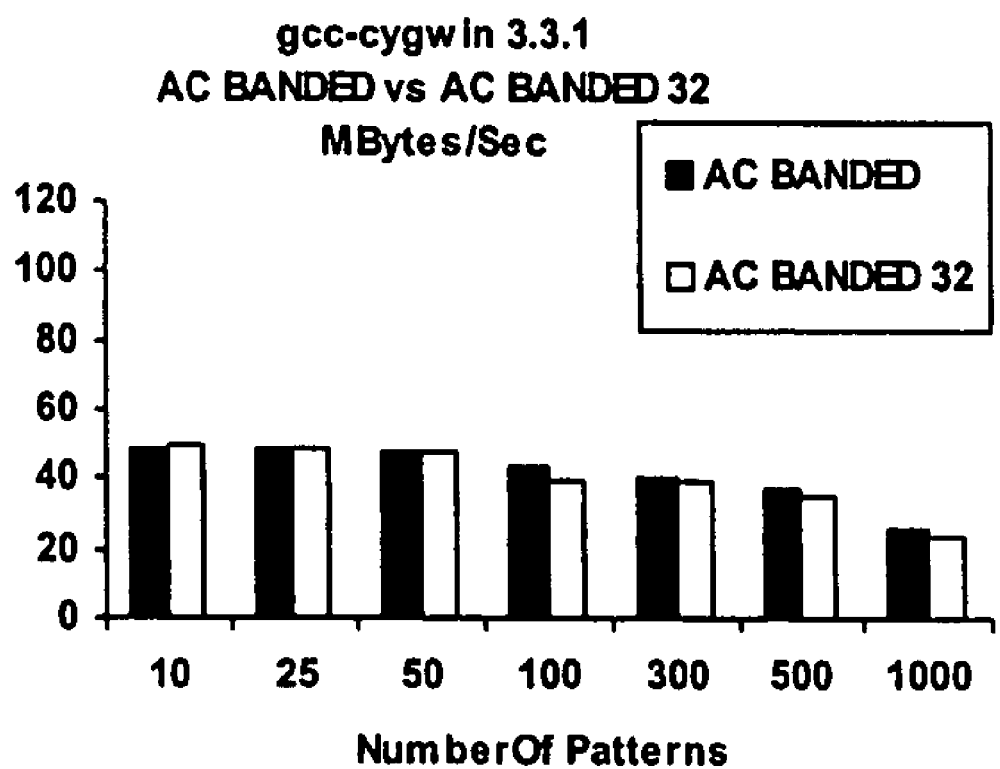
FIG. 16 is a bar graph showing exemplary test results for a dictionary search using an embodiment of the present invention using banded-row storage with sixteen bit and thirty-two bit state values both compiled with a Cygwin gcc 3.3.1 compiler.
Figure 17:
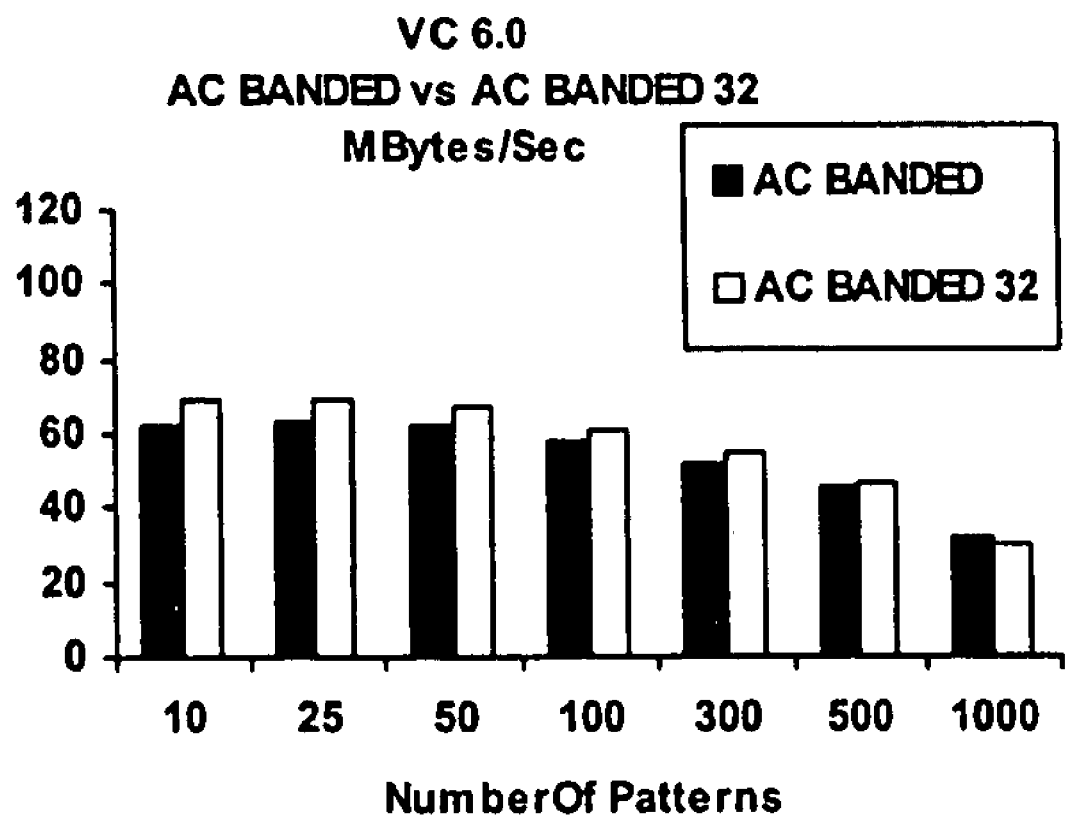
FIG. 17 is a bar graph showing exemplary test results for a dictionary search using an embodiment of the present invention using banded-row storage with sixteen bit and thirty-two bit state values both compiled with a Microsoft™ Visual C++™ 6.0 compiler.

An embodiment of the present invention using full matrix storage and an embodiment of the present invention using banded-row storage can use either sixteen bit state or thirty-two bit state values. The sixteen bit state values are limited to $2^{16}$ or sixty-five thousand states. The thirty-two bit state values are limited to $2^{32}$ or 4 billion states. The merit of using sixteen bit states is reduced memory consumption. FIGS. 12, 13, and 14 compare the performance of the sixteen bit (AC OPT) and the thirty-two bit (AC OPT 32) versions of an embodiment of the present invention using full matrix storage for the three compilers. The legends for the bar graphs in FIGS. 12-14 are the same. As shown in FIG. 12, AC OPT 1210 refers to the results from the sixteen bit version of an embodiment of the present invention using full matrix storage and AC OPT 32 1220 refers to the thirty-two bit version of an embodiment of the present invention using full matrix storage. FIGS. 15, 16, and 17 compare the performance of the sixteen bit (AC BANDED) and the thirty-two bit (AC BANDED 32) versions of an embodiment of the present invention using banded-row storage for the three compilers. The legends for the bar graphs in FIGS. 15-17 are the same. As shown in FIG. 15, AC BANDED 1510 refers to the results from the sixteen bit version of an embodiment of the present invention using banded-row storage and AC BANDED 32 1520 refers to the thirty-two bit version of an embodiment of the present invention using banded-row storage.

There are only minor differences between the sixteen and thirty-two bit versions of both an embodiment of the present invention using full matrix storage and an embodiment of the present invention using banded-row storage. The VC60 compiler demonstrates the largest difference across all pattern sizes and favors the 32 bit state size.

Snort processes packets on standard Ethernet based networks that are up to 1460 bytes of data per packet. This type of data tests search performance and search setup costs on smaller search texts, and in a relatively cache unfriendly environment. The tests were performed by replaying previously captured traffic directly into Snort. The compiler used was the Intel™ C 6.0 compiler on Linux. The test file selected represented about two G-bytes of web centric traffic. This test file was selected since Snort allows the selection of the amount of traffic inspected in each web request. The test worked as follows. Snort was configured to inspect the first three-hundred bytes of each web page request. This is typically how Snort might be configured. The Unix time command was used and the file was processed as usual, noting the user processing time. Snort then was configured to inspect each of the web pages completely as requested from the server. Once again, Snort was run and the user processing time was noted. The difference in times represented the pure pattern matching time required to pattern match the extra data. This test did not measure absolute performance. It did show the relative performance differences of each search engine in processing the additional data.

The test file test was run with each version of the Aho-Corasick algorithm and the Wu-Manber algorithm. The Wu-Manber algorithm in Snort is generally a very fast algorithm on average, but does not have a good worst-case scenario. It is included to show the relative merits of its good average case performance compared to the Aho-Corasick algorithms.

Figure 19:
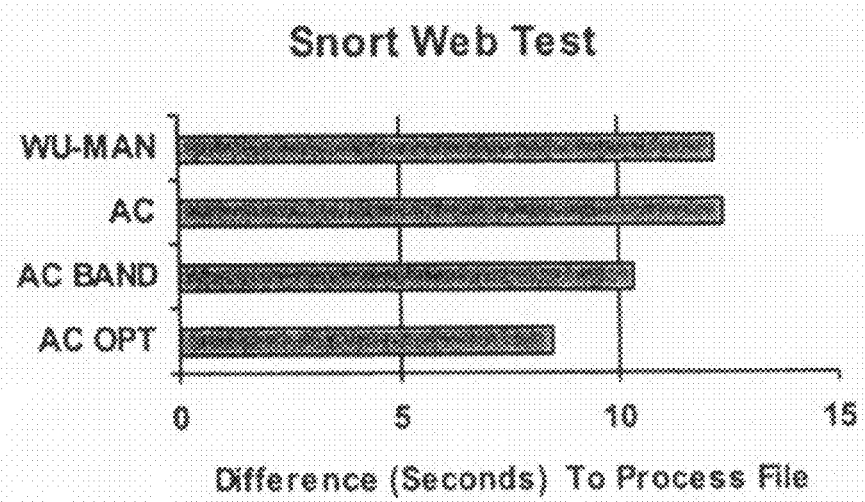
FIG. 19 is a bar graph showing exemplary test results a search of a two G-byte file of Web-centric network traffic using a Wu-Manber algorithm, the standard Aho-Corasick algorithm used in Snort, an embodiment of the present invention using full matrix storage, and an embodiment of the present invention using banded-row storage.

The time differences, computed speed, and performance increase over the standard Aho-Corasick is shown in FIG. 18 and FIG. 19. In FIGS. 18-19, WU-MAN refers to the results from the Wu-Manber algorithm, AC refers to the results from the standard version of the Aho-Corasick algorithm already in use in Snort, AC OPT refers to the results from an embodiment of the present invention using full matrix storage, and AC BAND refers to the results from an embodiment of the present invention using banded-row storage. These tests used a sixteen bit state size, were run on a system with dual 2.4 GHz Xeon™ cpus, and two G-bytes of RAM.

An embodiment of the present invention using full matrix storage and an embodiment of the present invention using banded-row storage are significantly faster than the standard Aho-Corasick algorithm and the Wu-Manber algorithm. The Web rules in Snort contain many small two byte patterns. This prevents the Wu-Manber algorithm from benefiting from a bad character shift strategy.

An embodiment of the present invention using full matrix storage is thirty-one percent (8.5/12.4) faster, which means the engine can perform forty-six percent (12.4/8.5) more pattern matching in the same time, and requires one-half the memory of original algorithm. An embodiment of the present invention using banded-row storage is seventeen percent faster and yields a twenty percent performance gain, and uses about one-fourth of the memory of the standard Aho-Corasick algorithm.

In accordance with an embodiment of the present invention, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Methods in accordance with an embodiment of the present invention disclosed herein can advantageously improve the performance of pattern matching in an IDS. One pattern matching method uses an optimized vector implementation of the Aho-Corasick state table that significantly improves performance. Another method uses sparse matrix storage to reduce memory requirements and further improve performance on large pattern groups.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for building a state table of a state machine algorithm in a pattern matching application, comprising:
    identifying at least one search pattern;
    creating a search pattern trie;
    adding the at least one search pattern to the search pattern trie;
    building a non-deterministic finite automata from the search pattern trie;
    building a deterministic finite automata from the non-deterministic finite automata;
    converting the deterministic finite automata into separate data structures comprising a state transition table, an array of per state matching pattern lists, and a separate failure pointer list for each state for the non-deterministic finite automata; and using the separate data structures as the state table.

2. The method of claim 1, the search pattern trie comprising a list of all valid characters for each state, each element of the list of all valid characters comprising a valid character and a next valid state, the at least one search pattern being added one character at a time, the non-deterministic finite automata replacing the search pattern trie with the non-deterministic finite automata in a list format, and the deterministic finite automata replacing the non-deterministic finite automata with the deterministic finite automata in a list format.

3. The method of claim 1, further comprising converting the characters of the at least one search pattern to uppercase.

4. The method of claim 1, the list of all valid characters for each state comprising a list of all valid uppercase characters for each state.

5. The method of claim 1, the state machine algorithm comprising Aho-Corasick.

6. The method of claim 1, the pattern matching application comprising one of an intrusion detection system, a passive network monitor, an active network monitor, a protocol analyzer, and a search engine.

7. The method of claim 1, the converting of the deterministic finite automata into a state transition table comprising:
    allocating a state vector for each state, wherein there is a state transition element of the state vector for the each element of the list of all valid characters; and
    copying the next valid state of the each element of the list of all valid characters into the each state transition elements of the state vector.

8. The method of claim 7, the state vector having two-hundred and fifty-six state transition elements.

9. The method of claim 7, each element of the state vector being sixteen bits.

10. The method of claim 7, an element of the state vector identifying the format of the state vector.

11. The method of claim 10, the format comprising full.

12. The method of claim 7, an element of the state vector identifying if the state vector comprises a matching pattern state.

13. The method of claim 1, the converting of the deterministic finite automata into a state transition table comprising:
    defining as a band a list of elements from a first nonzero next valid state from the list of all valid characters to a last nonzero next valid state from the list of all valid characters;
    allocating a state vector for each state, wherein there is a state transition element of the state vector for each element of the band;
    creating an element of the state vector to identify an index of the first nonzero next valid state from the list of all valid characters;
    creating an element of the state vector to identify a number of elements in the band; and
    copying a next valid state of each element of the band into the each state transition element of the state vector.

14. The method of claim 13, each element of the state vector being sixteen bits.

15. The method of claim 13, an element of the state vector identifying the format of the state vector.

16. The method of claim 15, the format comprising banded.

17. The method of claim 16, an element of the state vector identifying if the state vector comprises a matching pattern state.

* * * * *